United States Patent
Tanimoto

(10) Patent No.: US 8,296,391 B2
(45) Date of Patent: Oct. 23, 2012

(54) RELAY SERVER, RELAY COMMUNICATION SYSTEM, AND COMMUNICATION APPARATUS

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 0 days.

(21) Appl. No.: 13/061,725

(22) PCT Filed: Aug. 31, 2009

(86) PCT No.: PCT/JP2009/004255
§ 371 (c)(1),
(2), (4) Date: Mar. 2, 2011

(87) PCT Pub. No.: WO2010/026727
PCT Pub. Date: Mar. 11, 2010

(65) Prior Publication Data
US 2011/0179167 A1    Jul. 21, 2011

(30) Foreign Application Priority Data

Sep. 5, 2008  (JP) .................................. 2008-228948
Sep. 8, 2008  (JP) .................................. 2008-230312

(51) Int. Cl.
*G06F 15/16* (2006.01)
(52) U.S. Cl. ...................................................... 709/217
(58) Field of Classification Search .......... 709/226–229, 709/217–219
See application file for complete search history.

(56) References Cited

U.S. PATENT DOCUMENTS

| | | | |
|---|---|---|---|
| 6,574,656 B1 | 6/2003 | Nagaoka et al. | |
| 6,898,641 B1 | 5/2005 | Kobayashi | |
| 7,647,388 B2 | 1/2010 | Kato | |
| 8,065,418 B1 | 11/2011 | Abuan et al. | |
| 2002/0059436 A1 | 5/2002 | Kubo | |
| 2002/0143855 A1 | 10/2002 | Traversat et al. | |

(Continued)

FOREIGN PATENT DOCUMENTS

EP    1 940 126 A2    7/2008

(Continued)

OTHER PUBLICATIONS

Official Communication issued in International Patent Application No. PCT/JP2009/004255, mailed on Dec. 8, 2009.

(Continued)

*Primary Examiner* — Chirag R Patel
(74) *Attorney, Agent, or Firm* — Keating & Bennett, LLP

(57) ABSTRACT

In a relay communication system in which remote LANs communicate with one another beyond a WAN, a method and apparatus prevent crossover among a plurality of call controls in each of a plurality of sections and crossover among a plurality of communication routes in each of the plurality of sections. Relay servers relay communication between client terminals. A relay server creates information described below, and allows a whole of a relay communication system to share the information: relay group information indicating that the relay servers constitute a relay group; and relay server information indicating a client terminal capable of communicating with the relay server. The relay servers and the client terminals collate identification information of call control, which is transmitted when the call control is executed for a destination for communication in each section, and identification information of call control, which is received from the destination for communication in each section when a communication route is established, with each other, and allows the call controls and the communication routes to correspond to each other.

17 Claims, 24 Drawing Sheets

U.S. PATENT DOCUMENTS

| | | | |
|---|---|---|---|
| 2002/0143956 A1 | 10/2002 | Tanimoto | |
| 2002/0146002 A1 | 10/2002 | Sato | |
| 2003/0144872 A1 | 7/2003 | Masui et al. | |
| 2004/0078426 A1 | 4/2004 | Nagami et al. | |
| 2004/0172395 A1 | 9/2004 | Edelstein et al. | |
| 2006/0095501 A1* | 5/2006 | Mochida | 709/203 |
| 2006/0282540 A1 | 12/2006 | Tanimoto | |
| 2007/0233844 A1 | 10/2007 | Tanimoto | |
| 2007/0274329 A1 | 11/2007 | Takeyoshi et al. | |
| 2008/0089349 A1 | 4/2008 | Tanimoto | |
| 2008/0137672 A1 | 6/2008 | Tanimoto | |
| 2008/0288591 A1 | 11/2008 | Tanimoto | |
| 2008/0298367 A1 | 12/2008 | Furukawa | |
| 2009/0073969 A1* | 3/2009 | Gobara et al. | 370/389 |
| 2009/0319674 A1* | 12/2009 | Yahyaoui et al. | 709/228 |

FOREIGN PATENT DOCUMENTS

| | | | |
|---|---|---|---|
| EP | 1 942 634 A1 | 7/2008 | |
| JP | 04-105143 A | 4/1992 | |
| JP | 09-168055 A | 6/1997 | |
| JP | 09-282216 A | 10/1997 | |
| JP | 2000-059465 A | 2/2000 | |
| JP | 2001-092702 A | 4/2001 | |
| JP | 2001-292167 A | 10/2001 | |
| JP | 2001-306382 A | 11/2001 | |
| JP | 2002-007182 A | 1/2002 | |
| JP | 2002-149519 A | 5/2002 | |
| JP | 2002-217943 A | 8/2002 | |
| JP | 2002-247036 A | 8/2002 | |
| JP | 2002-314573 A | 10/2002 | |
| JP | 2004-139291 A | 5/2004 | |
| JP | 2004-265415 A | 9/2004 | |
| JP | 2004-310371 A | 11/2004 | |
| JP | 2005-086520 A | 3/2005 | |
| JP | 2005-267658 A | 9/2005 | |
| JP | 2005-328239 A | 11/2005 | |
| JP | 2006-343943 A | 12/2006 | |
| JP | 2007-104440 A | 4/2007 | |
| JP | 2007-267136 A | 10/2007 | |
| JP | 2008-098699 A | 4/2008 | |
| JP | 2008-098881 A | 4/2008 | |
| JP | 2008-129991 A | 6/2008 | |
| JP | 2008-140254 A | 6/2008 | |
| JP | 2008-148046 A | 6/2008 | |
| JP | 2008-148200 A | 6/2008 | |
| JP | 2009-027652 A | 2/2009 | |
| JP | 2010-178089 A | 8/2010 | |
| JP | 2011-055452 A | 3/2011 | |
| JP | 2011-055453 A | 3/2011 | |
| JP | 2011-055454 A | 3/2011 | |
| WO | 03/012578 A2 | 2/2003 | |
| WO | 2006/090465 A1 | 8/2006 | |

OTHER PUBLICATIONS

Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Tanimoto. Relay Device and Communication System, U.S. Appl. No. 11/723,466, filed Mar. 20, 2007.
Hitoshi, "Network World", vol. 9, No. 12, Dec. 1, 2004, pp. 148-150.
Tanimoto, "Relay Server, Communication System and Facsimile System", U.S. Appl. No. 10/045,698, filed Jan. 10, 2002.
Tanimoto, "Relay Server, Communication System and Facsimile System", U.S. Appl. No. 10/045,897, filed Jan. 10, 2002.
Tanimoto, "Relay Server for Relaying Communications Between Network Devices", U.S. Appl. No. 10/114,720, filed Apr. 1, 2002.
Tanimoto, "Relay Server", U.S. Appl. No. 10/114,963, filed Apr. 2, 2002.
Tanimoto, "Relay Server, Network Device, Communication System, and Communication Method", U.S. Appl. No. 10/116,615, filed Apr. 2, 2002.
Tanimoto, "First Relay Server and Second Relay Server", U.S. Appl. No. 13/255,958, filed Sep. 12, 2011.
Tanimoto, "Relay Server and Relay Communication System", U.S. Appl. No. 13/061,234, filed Feb. 28, 2011.
Official Communication issued in corresponding European Patent Application No. 09811257.6, mailed on Oct. 20, 2011.
Traversat et al., "Project JXTA 2.0 Super-Peer Virtual Network," May 25, 2003, pp. 1-20.
Tanimoto, "Relay-Server Arranged to carry out Communications between Communication Terminals on Different LANS,", U.S. Appl. No. 11/853,943, filed Sep. 12, 2007.
Tanimoto, "File Server Device Arranged in a local Area Network and Being Communicable with an external Service Arranged in a wide Area Network,", U.S. Appl. No. 11/862,654, filed Sep. 27, 2007.
Tanimoto, "File Transfer Server,", U.S. Appl. No. 11/870,622, filed Oct. 11, 2007.
Tanimoto, "Relay Server and Client Terminal,", U.S. Appl. No. 11/953,351, filed Dec. 10, 2007.
Tanimoto, "Relay Server, Relay Communication System, and Communication Device,", U.S. Appl. No. 11/944,495, filed Nov. 23, 2007.
Tanimoto, "Relay Server and Relay Communication System Arranged to Share Resources Between Networks,", U.S. Appl. No. 11/953,505, filed Dec. 10, 2007.
Tanimoto, "Relay Server and Relay Communication System,", U.S. Appl. No. 12/103,933, filed Apr. 16, 2008.
Tanimoto, "Relay Server and Relay Communication System,", U.S. Appl. No. 12/112,127, filed Apr. 30, 2008.
Tanimoto, "Relay Server and Relay Communication System,", U.S. Appl. No. 12/107,793, filed Apr. 23, 2008.
Tanimoto, "Relay Server and Relay Communication System,", U.S. Appl. No. 12/270,883, filed Nov. 14, 2008.
Tanimoto, "Relay Server adn Relay Communication System,", U.S. Appl. No. 12/335,642, filed Dec. 16, 2008.
Tanimoto, "Relay Server and Relay Communication System,", U.S. Appl. No. 12/335,661, filed Dec. 16, 2008.
Tanimoto, "Relay Server and Relay Communication System,", U.S. Appl. No. 12/340,868, filed Dec. 22, 2008.
Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.
English translation of Official Communication issued in corresponding International Application PCT/JP2009/004255, mailed on Aug. 31, 2009.
Tanimoto, "Relay Device and Communication System", U.S. Appl. No. 13/341,711, filed Dec. 30, 2011.
Tanimoto, "Relay Communication System and First Relay Server,", U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S Appl. No. 13/496,664, filed Mar. 16, 2012.

* cited by examiner

FIG. 4

```
/-50
<?xml version= "1.0" encoding= "UTF-8" ?>
-<root>
  -<site id= "relay-server-1@abc.net"
    name= "RELAY SERVER 1" stat= "active" >  } 501-1
    <node div= "software"           ~503-1
      group= "20070402133100@relay-server-1.abc.net"   } 502
      id= "client-1@relay-server-1.abc.net"              -1
      name= "CLIENT 1" site= "relay-server-1@abc.net" />
  </site>                 ~504-1
  -<site id= "relay-server-2@abc.net"
    name= "RELAY SERVER 2" stat= "active" >  } 501-2
    <node div= "software"           ~503-2
      group= "20070402133100@relay-server-1.abc.net"   } 502
      id= "client-2@relay-server-2.abc.net"              -2
      name= "CLIENT 2" site= "relay-server-2@abc.net" />
  </site>                 ~504-2
</root>
```

FIG. 5

```
           /-60
<?xml version= "1.0" encoding= "UTF-8" ?>
-<root>
  <node div= "software"
    group= "20070402133100@relay-server-1.abc.net"
601~ node addr= "192.168.10.2" expr= "1213935960484"
    id= "client-1@relay-server-1.abc.net"   ~602
    name= "CLIENT 1" pass= "client-1" port= "5070" />
</root>                              ~603
```

```
           /-70
<?xml version= "1.0" encoding= "UTF-8" ?>
-<root>
  <node div= "software"
    group= "20070402133100@relay-server-1.abc.net"
701~ node addr= "192.168.1.10" expr= "1213935978484"
    id= "client-2@relay-server-2.abc.net"   ~702
    name= "CLIENT 2" pass= "client-2" port= "5070" />
</root>                              ~703
```

```
                                                    ┌─51-1
┌──────────────────────────────────────────────────┴─────────┐
│ <?xml version= "1.0" encoding= "UTF-8" ?>                  │
│ -<root>                                                    │
│  -<site id= "relay-server-1@abc.net"            ⎫          │
│    name= "RELAY SERVER 1" stat= "active" >      ⎬ 511-1    │
│    <node div= "software"      ∽513-1            ⎫          │
│     group= "20070402133100@relay-server-1.abc.net" ⎬ 512-1 │
│     id= "client-1@relay-server-1.abc.net"       ⎬          │
│     name= "CLIENT 1" site= "" />                ⎭          │
│   </site>                  ∽514-1                          │
│ </root>                                                    │
└────────────────────────────────────────────────────────────┘

┌─51-2
┌──────────────────────────────────────────────────┴─────────┐
│ <?xml version= "1.0" encoding= "UTF-8" ?>                  │
│ -<root>                                                    │
│  -<site id= "relay-server-2@abc.net"            ⎫          │
│    name= "RELAY SERVER 2" stat= "active" >      ⎬ 511-2    │
│    <node div= "software"      ∽513-2            ⎫          │
│     group= "20070402133100@relay-server-1.abc.net" ⎬ 512-2 │
│     id= "client-2@relay-server-2.abc.net"       ⎬          │
│     name= "CLIENT 2" site= "" />                ⎭          │
│   </site>                  ∽514-2                          │
│ </root>                                                    │
└────────────────────────────────────────────────────────────┘
```

FIG. 7

```
                                            ┌42
┌─────────────────────────────────────────────────────────┐
│ <?xml version= "1.0" encoding= "UTF-8" standalone= "no" ?> │
│ -<root>                                                 │
│   -<group id= "20070402133100@relay-server-1.abc.net"  ⎫│
│      lastmod= "20070402133100" name= "GROUP 1" >       ⎬421
│     <site id= "relay-server-1@abc.net" />  ⎫           ⎭│
│     <site id= "relay-server-2@abc.net" />  ⎬422        │
│   </group>                                 ⎭           │
│ </root>                                                │
└─────────────────────────────────────────────────────────┘
```

```
                                      ┌52
┌─────────────────────────────────────────────────────────┐
│ <?xml version= "1.0" encoding= "UTF-8" ?>               │
│ -<root>                                                 │
│   -<site id= "relay-server-1@abc.net"       ⎫           │
│      name= "RELAY SERVER 1" stat= "active" >⎬521-1      │
│     <node div= "software"                   ⎭⎫          │
│       group= "20070402133100@relay-server-1.abc.net" ⎬522-1│
│       id= "client-1@relay-server-1.abc.net"          ⎭│
│       name= "CLIENT 1" site= "" />                     │
│   </site>                                              │
│   -<site id= "relay-server-2@abc.net"       ⎫           │
│      name= "RELAY SERVER 2" stat= "active" >⎬521-2      │
│     <node div= "software"                   ⎭⎫          │
│       group= "20070402133100@relay-server-1.abc.net" ⎬522-2│
│       id= "client-2@relay-server-2.abc.net"          ⎭│
│       name= "CLIENT 2" site= "" />                     │
│   </site>                                              │
│ </root>                                                │
└─────────────────────────────────────────────────────────┘
```

```
                                      ┌62
┌─────────────────────────────────────────────────────────┐
│ <?xml version= "1.0" encoding= "UTF-8" ?>               │
│ -<root>                                                 │
│   <node div= "software"                                │
│     group= "20070402133100@relay-server-1.abc.net"     │
│621⟿ node addr= "" expr= "0" ⟿622                       │
│     id= "client-1@relay-server-1.abc.net"              │
│     name= "CLIENT 1" pass= "client-1" port= "" />      │
│ </root>                                       ⟋623     │
└─────────────────────────────────────────────────────────┘
```

```
                                      ┌72
┌─────────────────────────────────────────────────────────┐
│ <?xml version= "1.0" encoding= "UTF-8" ?>               │
│ -<root>                                                 │
│   <node div= "software"                                │
│     group= "20070402133100@relay-server-1.abc.net"     │
│721⟿ node addr= "" expr= "0" ⟿722                       │
│     id= "client-2@relay-server-2.abc.net"              │
│     name= "CLIENT 2" pass= "client-2" port= "" />      │
│ </root>                                       ⟋723     │
└─────────────────────────────────────────────────────────┘
```

FIG. 8

```
                                                  ┌─42
        ┌────────────────────────────────────────────────────────────────┐
        │ <?xml version= "1.0" encoding= "UTF-8" standalone= "no" ?>     │
        │ -<root>                                                        │
        │  -<group id= "20070402133100@relay-server-1.abc.net"           │
        │     lastmod= "20070402133100" name= "GROUP 1" >                │
        │    <site id= "relay-server-1@abc.net" />                       │
        │    <site id= "relay-server-2@abc.net" />                       │
        │  </group>                                                      │
        │ </root>                                                        │
        └────────────────────────────────────────────────────────────────┘

┌─53
        ┌────────────────────────────────────────────────────────────────┐
        │ <?xml version= "1.0" encoding= "UTF-8" ?>                      │
        │ -<root>                                                        │
        │  -<site id= "relay-server-1@abc.net"                           │
        │     name= "RELAY SERVER 1" stat= "active" >                    │
        │    <node div= "software"                             ⎫         │
        │      group= "20070402133100@relay-server-1.abc.net"  ⎬ 532     │
        │      id= "client-1@relay-server-1.abc.net"           ⎪  -1     │
        │      name= "CLIENT 1" site= "relay-server-1@abc.net" />⎭       │
        │   </site>             ⌐534-1                                   │
        │  -<site id= "relay-server-2@abc.net"                           │
        │     name= "RELAY SERVER 2" stat= "active" >                    │
        │    <node div= "software"   ⌐533-2                              │
        │      group= "20070402133100@relay-server-1.abc.net"            │
        │      id= "client-2@relay-server-2.abc.net"                     │
        │      name= "CLIENT 2" site= "" />                              │
        │   </site>                                                      │
        │ </root>                                                        │
        └────────────────────────────────────────────────────────────────┘

┌─63
        ┌────────────────────────────────────────────────────────────────┐
        │ <?xml version= "1.0" encoding= "UTF-8" ?>                      │
        │ -<root>                                                        │
        │   <node div= "software"                                        │
        │     group= "20070402133100@relay-server-1.abc.net"             │
   631 ─│─    node addr= "192.168.10.2" expr= "1213935960484"            │
        │     id= "client-1@relay-server-1.abc.net"   ⌐632               │
        │     name= "CLIENT 1" pass= "client-1" port= "5070" />          │
        │ </root>                                              ⌐633      │
        └────────────────────────────────────────────────────────────────┘

┌─72
        ┌────────────────────────────────────────────────────────────────┐
        │ <?xml version= "1.0" encoding= "UTF-8" ?>                      │
        │ -<root>                                                        │
        │   <node div= "software"                                        │
        │     group= "20070402133100@relay-server-1.abc.net"             │
   721 ─│─    node addr= "" expr= "0"                                    │
        │     id= "client-2@relay-server-2.abc.net"                      │
        │     name= "CLIENT 2" pass= "client-2" port= "" />              │
        │ </root>                                              ⌐723      │
        └────────────────────────────────────────────────────────────────┘
```

FIG. 9

```
                                                    ┌─42
 ┌─────────────────────────────────────────────────────────────┐
 │ <?xml version= "1.0" encoding= "UTF-8" standalone= "no" ?>  │
 │ -<root>                                                     │
 │  -<group id= "20070402133100@relay-server-1.abc.net"        │
 │     lastmod= "20070402133100" name= "GROUP 1" >             │
 │    <site id= "relay-server-1@abc.net" />  ⎫                 │
 │    <site id= "relay-server-2@abc.net" />  ⎬ 422             │
 │  </group>                                                   │
 │ </root>                                                     │
 └─────────────────────────────────────────────────────────────┘

┌─54
 ┌─────────────────────────────────────────────────────────────┐
 │ <?xml version= "1.0" encoding= "UTF-8" ?>                   │
 │ -<root>                                                     │
 │  -<site id= "relay-server-1@abc.net"                        │
 │     name= "RELAY SERVER 1" stat= "active" >                 │
 │    <node div= "software"        ⌐ 543-1         ⎫           │
 │     group= "20070402133100@relay-server-1.abc.net"  ⎬ 542   │
 │     id= "client-1@relay-server-1.abc.net"           ⎪  -1   │
 │     name= "CLIENT 1" site= "relay-server-1@abc.net" />⎭     │
 │   </site>                                                   │
 │  -<site id= "relay-server-2@abc.net"       ⎫ 541-2          │
 │     name= "RELAY SERVER 2" stat= "active" >⎭                │
 │    <node div= "software"        ⌐ 543-2         ⎫           │
 │     group= "20070402133100@relay-server-1.abc.net"  ⎬ 542   │
 │     id= "client-2@relay-server-2.abc.net"           ⎪  -2   │
 │     name= "CLIENT 2" site= "relay-server-2@abc.net" />⎭     │
 │   </site>                  ⌐ 544-2                          │
 │ </root>                                                     │
 └─────────────────────────────────────────────────────────────┘

┌─63
 ┌─────────────────────────────────────────────────────────────┐
 │ <?xml version= "1.0" encoding= "UTF-8" ?>                   │
 │ -<root>                                                     │
 │   <node div= "software"                                     │
 │    group= "20070402133100@relay-server-1.abc.net"           │
 │ 631 ⌐ node addr= "192.168.10.2" expr= "1213935960484"       │
 │    id= "client-1@relay-server-1.abc.net"                    │
 │    name= "CLIENT 1" pass= "client-1" port= "5070" />        │
 │ </root>                                       ⌐ 633         │
 └─────────────────────────────────────────────────────────────┘

┌─74
 ┌─────────────────────────────────────────────────────────────┐
 │ <?xml version= "1.0" encoding= "UTF-8" ?>                   │
 │ -<root>                                                     │
 │   <node div= "software"                                     │
 │    group= "20070402133100@relay-server-1.abc.net"           │
 │ 741 ⌐ node addr= "192.168.1.10" expr= "1213935978484"       │
 │    id= "client-2@relay-server-2.abc.net"   ⌐ 742            │
 │    name= "CLIENT 2" pass= "client-2" port= "5070" />        │
 │ </root>                                       ⌐ 743         │
 └─────────────────────────────────────────────────────────────┘
```

```
┌─50
<?xml version= "1.0" encoding= "UTF-8" ?>
-<root>
 -<site id= "relay-server-1@abc.net"
    name= "RELAY SERVER 1" stat= "active" >  } 501-1
    <node div= "software"     ~503-1
      group= "20070402133100@relay-server-1.abc.net"  } 502
      id= "client-1@relay-server-1.abc.net"            -1
      name= "CLIENT 1" site= "relay-server-1@abc.net" />
 </site>         ~504-1
 -<site id= "relay-server-2@abc.net"
    name= "RELAY SERVER 2" stat= "active" >  } 501-2
    <node div= "software"     ~503-2
      group= "20070402133100@relay-server-1.abc.net"  } 502
      id= "client-2@relay-server-2.abc.net"            -2
      name= "CLIENT 2" site= "relay-server-2@abc.net" />
 </site>         ~504-2
</root>
```

FIG. 22

```
    ┌─60
   <?xml version= "1.0" encoding= "UTF-8" ?>
  -<root>
    <node div= "software"
      group= "20070402133100@relay-server-1.abc.net"
601 ~ node addr= "192.168.10.2" expr= "1213935960484"
      id= "client-1@relay-server-1.abc.net"    ~602
      name= "CLIENT 1" pass= "client-1" port= "5070" />
  </root>                                        ~603
```

```
    ┌─70
   <?xml version= "1.0" encoding= "UTF-8" ?>
  -<root>
    <node div= "software"
      group= "20070402133100@relay-server-1.abc.net"
701 ~ node addr= "192.168.1.10" expr= "1213935978484"
      id= "client-2@relay-server-2.abc.net"    ~702
      name= "CLIENT 2" pass= "client-2" port= "5070" />
  </root>                                        ~703
```

```xml
<?xml version="1.0" encoding="UTF-8" standalone="no"?>
<root>
    <workspace group="*" id="-0e1ab35" lastmod="1215530239484"
        name="WORKSPACE" owner="client-2@relay-server-2.abc.net">                    ~811
        <root_account id="c089241" lastmod="1215530239484">
            <account id="client-1@relay-server-1.abc.net"/>                           ~812
            <account id="client-2@relay-server-2.abc.net"/>
        </root_account>
        <root_msg id="-4611a4d" lastmod="1215530239484"/>
        <root_resource id="-e575ab0" lastmod="1215531987906">
            <resource id="f496f21" lastmod="1215562516562" len="0" name="f003"
                owner="client-2@relay-server-2.abc.net"                               813-1
                stat="ok" type="dir" value="C:\f003">
            <resource id="-a65ecaf" lastmod="1179373962468" len="12938752"
                name="PRESENTATION MATERIAL.ppt" owner="client-2@relay-server-2.abc.net"  813-2
                stat="ok" type="file" value="C:\f003\PRESENTATION MATERIAL.ppt"/>
            <resource id="-1988a62" lastmod="1197876802571" len="5076"
                name="MEETING MINUTES.txt" owner="client-2@relay-server-2.abc.net"    813-3
                stat="ok" type="file" value="C:\f003\MEETING MINUTES.txt"/>
            <resource id="-4fafc96" lastmod="1190722805687" len="166888"
                name="2007 INTERIM REPORT.pdf" owner="client-2@relay-server-2.abc.net"  813-4
                stat="ok" type="file" value="C:\f003\2007 INTERIM REPORT.pdf"/>
            <resource id="d786236" lastmod="1193744624062" len="12529"
                name="TEST RESULT.doc" owner="client-2@relay-server-2.abc.net"         813-5
                stat="ok" type="file" value="C:\f003\TEST RESULT.doc"/>
            </resource>                                                                ~813-1
        </root_resource>
    </workspace>
</root>
```

FIG. 23

```
<?xml version="1.0" encoding="UTF-8" standalone="no"?>
<root>
    <workspace id="-0e1ab35" path="C:¥Download Folder">          ~821
        <resource id="-a65ecaf" path="C:¥Download Folder¥PRESENTATION MATERIAL.ppt"/>   ~822-1
        <resource id="-1988a62" path="C:¥Download Folder¥MEETING MINUTES.txt"/>
    </workspace>                                                  ~822-2
</root>
```

82, 821, 822-1, 814-2, 822-2

```
<?xml version="1.0" encoding="UTF-8" standalone="no"?>
<root>
    <workspace id="-0e1ab35" path="C:¥Download Folder">
        <resource id="-a65ecaf" path="C:¥Download Folder¥PRESENTATION MATERIAL.ppt"/>
        <resource id="-1988a62" path="C:¥Download Folder¥MEETING MINUTES.txt"/>
        <resource id="-4fafc96" path="C:¥Download Folder¥2007 INTERIM REPORT.pdf"/>
    </workspace>
</root>
```

FIG. 27

RELAY SERVER, RELAY COMMUNICATION SYSTEM, AND COMMUNICATION APPARATUS

BACKGROUND OF THE INVENTION

1. Field of the Invention

The present invention relates to a relay server, a relay communication system and a communication apparatus, which enable a client terminal connected to a remote local area network (LAN) to make communication beyond a wide area network (WAN).

2. Description of the Related Art

Client terminals connected to remote LANs sometimes communicate with one another beyond a WAN. The virtual private network (VPN) can construct a network that appears as if the remote LANs were directly connected to each other. However, it is difficult for the VPN to construct a network having expandability and flexibility.

A relay communication system disclosed in Japanese Patent Laid-Open Publication No. 2008-129991 can construct a network that appears as if the remote LANs were directly connected to one another in a similar way to the VPN. Then, unlike the VPN, it is easy for the relay communication system to construct the network having expandability and flexibility.

The relay communication system includes a WAN and a plurality of LANs. Each of the LANs includes a relay server. Each relay server stores relay group information regarding relay servers provided in the relay communication system, and shared resource information regarding resources shared in the relay communication system.

When a client terminal connected to one of the LANs manipulates resources stored by client terminals of other LANs, the relay servers connected to these LANS relay the manipulation for the resources based on the relay group information and the shared resource information.

The number of LANs provided in the relay communication system may sometimes be increased or reduced. The resources shared in the relay communication system may sometimes be updated. However, the relay communication system can update the relay group information and the shared resource information in response to these changes. Then, the relay communication system can construct the network having expandability and flexibility in response to these changes.

Moreover, a relay communication system disclosed in Japanese Patent Laid-Open Publication No. 2008-140254 can construct a network as if the remote LANs were directly connected to one another in a similar way to Japanese Patent Laid-Open Publication No. 2008-129991. A client terminal determines whether or not it can directly manipulate a shared resource in the relay communication system. In the case where the client terminal cannot directly manipulate the shared resource, it instructs a client terminal, which stores the shared resource, to manipulate the shared resource via a relay server.

In the relay communication system disclosed in Japanese Patent Laid-Open Publication No. 2008-129991, the client terminal connected to one of the LANs performs communication with the client terminal connected to another LAN in the following manner.

As a first section, between the client terminal and the relay server that are connected to the one of the LANs, the communication is started. As an intermediate section, between the relay servers connected to the one of the LANs and the another LAN, the communication is relayed. As a final section, between the relay server and the client terminal that are connected to the another LAN, the communication is ended.

In each of the sections, a plurality of call controls may be executed, and a plurality of media sessions may be established. However, specific means for preventing crossover among the plurality of call controls and preventing crossover among the plurality of media sessions in each of the sections is not disclosed in Japanese Patent Laid-Open Publication No. 2008-129991.

In the relay communication system disclosed in Japanese Patent Laid-Open Publication No. 2008-129991, a change may occur in the number of LANs and client terminals, and in the connection state between the LANs and the client terminals. However, specific means are not disclosed in Japanese Patent Laid-Open Publication No. 2008-129991 for confirming in real time such changes in the number and a connection state of the client terminals and relay servers in the event that they designate destinations for communication.

Moreover, in the relay communication system disclosed in Japanese Patent Laid-Open Publication No. 2008-140254 and Japanese Patent Laid-Open Publication No. 2008-129991, each of the client terminals sometimes downloads a shared resource in order to edit the shared resource that cannot be directly manipulated thereby. An entity of the downloaded resource and an entity of such an original shared resource are present separately from each other, and accordingly, it is possible to edit the respective resources separately from each other. However, in the case where the respective resources are edited separately from each other, it has not been possible to unify and manage information recorded in the respective resources.

SUMMARY OF THE INVENTION

In consideration of the foregoing problems, preferred embodiments of the present invention provide an apparatus and method that prevent crossover among a plurality of call controls in each of a plurality of sections and prevent crossover among a plurality of media sessions in each of the plurality of sections in a relay communication system that enables client terminals connected to remote LANs to communicate with one another beyond a WAN.

Also, in consideration of the foregoing problems, other preferred embodiments of the present invention provide an apparatus and method to confirm in real time the changes in the number and the connection state of client terminals and relay servers in the event if they designate the designation for communication in a relay communication system, so as to enable the client terminals connected to remote LANs to communicate with one another beyond a WAN.

A relay server according to a preferred embodiment of the present invention is a relay server to communicate with a first relay server connected to a first network, and to function as a second relay server connected to a second network. The relay server includes a relay group information creation unit; an inter-relay server sharing unit; a client terminal-oriented sharing unit; and a communication execution unit. The relay group information creation unit creates relay group information indicating that the first relay server and the second relay server constitute a relay group. The inter-relay server sharing unit shares relay server information and relay group information between the first relay server and the second relay server. The relay server information includes first relay server information, and second relay server information. The first relay server information is created by the first relay server, and includes first relay server activation information indicating an activation state of the first relay server, and first client terminal registration information regarding a first client terminal connected to the first network and registered in the first relay server, and the first client terminal registration information includes a connection state between the first relay server and the first client terminal. The second relay server information is created by the second relay server, and includes second relay server activation information indicating an activation state of the second relay server, and second client terminal registration information regarding a second client terminal connected to the second network and registered in the second relay server, and the second client terminal registration information includes a connection state between the second relay server and the second client terminal. The client terminal-oriented sharing unit shares the relay group information and the relay server information between the second relay server and the second client terminal. The communication execution unit performs communication, which is relayed by the second relay server, and is performed with an addressee selected based on the relay group information and the relay server information. The communication execution unit includes: a transfer destination decision unit; a call control establishment unit; and a communication route establishment unit. Based on the addressee, the relay group information and the relay server information, the transfer destination decision unit determines a transfer destination of the communication relayed by the second relay server. The call control establishment unit establishes a first session with the transfer destination by using a call control protocol. Upon having received an establishment request for a communication route from the transfer destination, the communication route establishment unit confirms whether or not identification information received along with the establishment request matched identification information included in call control information of the first session, and in a case where the received identification information coincides with the included identification information, establishes a first communication route corresponding to call control of the first session.

The call control establishment unit preferably includes a parallel call control establishment unit, and a parallel communication route establishment unit. The parallel call control establishment unit establishes a second session with the transfer destination by using call control protocol. Upon having received an establishment request for a communication route from the transfer destination, the parallel communication route establishment unit confirms whether or not second identification information received along with the establishment request matches an identification information included in call control information of the second session, and when the received second identification information matches the included identification information, establishes a second communication route corresponding to call control of the second session.

A relay communication system according to another preferred embodiment of the present invention includes a first network; a second network; a first relay server connected to the first network; and a second relay server connected to the second network. Each of the first relay server and the second relay server includes a relay group information creation unit that creates relay group information indicating that the first relay server and the second relay server constitute a relay group. The first relay server includes a first relay server information creation unit that creates first relay server information. The first relay server information includes first relay server activation information indicating an activation state of the first relay server, and first client terminal registration information regarding a first client terminal connected to the first network and registered in the first relay, the first client termi-nal registration information includes a connection state between the first relay server and the first client terminal. The second relay server includes a second relay server information creation unit that creates second relay server information. The second relay server information includes second relay server activation information indicating an activation state of the second relay server, and second client terminal registration information regarding a second client terminal connected to the second network and registered in the second relay, and the second client terminal registration information includes a connection state between the second relay server and the second client terminal. Each of the first relay server and the second relay server includes an inter-relay server sharing unit. The inter-relay server sharing unit shares the relay group information and relay server information including the first relay server information and the second relay server information between the first relay server and the second relay server. The first relay server includes a first client terminal-oriented sharing unit. The first client terminal-oriented sharing unit shares the relay group information and the relay server information between the first relay server and the first client terminal. The second relay server includes a second client terminal-oriented sharing unit. The second client terminal-oriented sharing unit shares the relay group information and the relay server information between the second relay server and the second client terminal. The first relay server includes a communication execution unit. The communication execution unit performs communication, which is relayed by the first relay server, and is performed with an addressee selected based on the relay group information and the relay server information. The communication execution unit preferably includes a transfer destination decision unit; a call control establishment unit; and a communication route establishment unit. Based on the addressee, the relay group information and the relay server information, the transfer destination decision unit determines a transfer destination of the communication relayed by the first relay server. The call control establishment unit establishes a first session with the transfer destination by using a call control protocol. Upon having received an establishment request for a communication route from the transfer destination, the communication route establishment unit confirms whether or not first identification information received together with the establishment request coincides with identification information included in call control information of the first session, and in a case where the received first identification information coincides with the included identification information, establishes a first communication route allowed to correspond to call control of the first session.

The call control establishment unit preferably includes a parallel call control establishment unit, and a parallel communication route establishment unit. The parallel call control establishment unit establishes a second session with the transfer destination by using call control protocol. Upon having received an establishment request for a communication route from the transfer destination, the parallel communication route establishment unit confirms whether or not second identification information received along with the establishment request matches an identification information included in call control information of the second session, and when the received second identification information matches the included identification information, establishes a second communication route corresponding to call control of the second session.

A communication apparatus according to a further preferred embodiment of the present invention a communication apparatus to communicate through a first relay server connected to a first network with a second relay server connected to a second network, and to function as a first client terminal connected to the first network. The communication apparatus preferably includes a relay group information storage unit; a relay server information storage unit; a shared resource information management unit; and a copy resource information management unit. The relay group information storage unit stores relay group information indicating that the first relay server and the second relay server constitute a relay group. The relay server information storage unit stores relay server information. The relay server information includes first relay server information, and second relay server information. The first relay server information is created by the first relay server, and includes first relay server activation information indicating an activation state of the first relay server, and first client terminal registration information regarding a first client terminal which is registered in the first relay server, and the first client terminal registration information includes a connection state between the first relay server and the first client terminal. The second relay server information is created by the second relay server, and includes second relay server activation information indicating an activation state of the second relay server, and second client terminal registration information regarding a second client terminal connected to the second network and registered in the second relay server, and the second client terminal registration information includes a connection state between the second relay server and the second client terminal. The shared resource information management unit manages shared resource information regarding a shared resource shared with the second client terminal. The copy resource information management unit acquires a copy of a first shared resource based on the relay group information, the relay server information and the shared resource information, and manages a copy resource individual information that allows the first shared resource and the copy of the first shared resource to correspond to each other.

The communication apparatus preferably also includes an update instruction unit that assigns a storage destination of the first shared resource so as to replace the first shared resource with the copy of the first shared resource based on the relay group information, the relay server information and the shared resource information.

When the first shared resource is deleted, the copy resource information management unit preferably releases the corresponding relationship between the first shared resource and the copy of the first shared resource.

When the sharing of the first shared resource is released, the copy resource information management unit preferably releases the corresponding relationship between the first shared resource and the copy of the first shared resource.

When the copy of the first shared resource is deleted, the copy resource information management unit preferably releases the corresponding relationship between the first shared resource and the copy of the first shared resource.

The communication apparatus preferably further includes a monitor on which an operation screen is displayed based on the shared resource information and the copy resource individual information.

The relay communication system according to a preferred embodiment of the present invention includes the first network and the second network. The first network includes the first relay server and the first client terminal. The second network includes the second relay server and the second client terminal. The first relay server and the second relay server relay the communication between the first client terminal and the second client terminal.

The first (second) relay server creates the relay group information, the first (second) relay server information, and the client terminal information. The relay group information is the information indicating that the first relay server and the second relay server constitute the relay group. The first (second) relay server information is the information indicating the first (second) client terminal capable of communicating with the first (second) relay server. The client terminal information is the information indicating the connection environment of the first (second) client terminal in the first (second) network.

The first (second) relay server refers to the relay group information, and thereby can share the first relay server information and the second relay server information between the first relay server and the second relay server. The first (second) relay server refers to the client terminal information of each thereof, and thereby can share the relay group information and the relay server information between the first (second) relay server and the first (second) client terminal.

The first (second) relay server performs the communication, which is relayed by the first (second) relay server, and is performed with an addressee selected based on the relay group information and the relay server information. Based on the addressee, the relay group information and the relay server information, the first (second) relay server determines a transfer destination of the communication relayed by the first (second) relay server.

The first (second) relay server transmits the identification information of the call control to the transfer destination when executing the call control for the transfer destination. When the communication route is established from the transfer destination, the first (second) relay server receives the identification information of the call control from the transfer destination. The first (second) relay server collates the transmitted/received identification information of the call controls with each other, and thereby allows the call controls and the communication routes to correspond to each other.

When executing the call control for the first (second) relay server, the first (second) client terminal transmits the identification information of the call control to the first (second) relay server. When the communication route is established from the first (second) relay server, the first (second) client terminal receives the identification information of the call control from the first (second) relay server. The first (second) client terminal collates the transmitted/received identification information of the call controls with each other, and thereby allows the call controls and the communication routes to correspond to each other.

In the event of executing the plurality of call controls, the first (second) relay server and the first (second) client terminal allow the respective call controls and the respective communication routes to correspond to each other, thereby can prevent the crossover among the plurality of call controls, and can prevent the crossover among the plurality of communication routes.

The communication apparatus according to another preferred embodiment of the present invention confirms whether or not it is possible to communicate with the second client terminal connected to the second network based on the relay server information. In such a way, the communication apparatus according to the present preferred embodiment of the present invention becomes capable of the communication corresponding to the situation of the communication destination.

Moreover, when acquiring the copy of the first shared resource shared with the second client terminal, the communication apparatus according to the present preferred embodiment of the present invention manages the copy of the first shared resource in association with the first shared resource. In such a way, it becomes easy to integrally manage the shared resource and such a resource derived from the shared resource.

Moreover, the communication apparatus according to the present preferred embodiment of the present invention instructs the storage destination of the first shared resource to update the first shared resource based on the first shared resource. In such a way, even from a communication apparatus that cannot directly edit the shared resource, an edition content of the copy of the shared resource can be easily reflected on the shared resource.

Moreover, the communication apparatus according to the present preferred embodiment of the present invention can delete the copy resource information when deleting the shared resource or when deleting the copy of the shared resource. As described above, the copy resource information is updated in response to the change of the correspondence relationship between the copy of the shared resource and the shared resource, and accordingly, it becomes easier to manage the copy of the shared resource.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4 is a view showing a specific example of relay server information in the First Preferred Embodiment of the present invention.

FIG. 5 is a view showing a specific example of client terminal information in the First Preferred Embodiment of the present invention.

FIG. 7 is a view showing information stored after Step S2 in the First Preferred Embodiment of the present invention.

FIG. 8 is a view showing information stored after Step S4 in the First Preferred Embodiment of the present invention.

FIG. 9 is a view showing information stored after Step S7 in the First Preferred Embodiment of the present invention.

FIG. 10 is a view showing information stored after Step S11 in the First Preferred Embodiment of the present invention.

FIG. 21 is a view showing a specific example of relay server information in the Second Preferred Embodiment of the present invention.

FIG. 22 is a view showing a specific example of client terminal information in the Second Preferred Embodiment of the present invention.

FIG. 23 is a view showing a specific example of shared resource management information in the Second Preferred Embodiment of the present invention.

FIG. 27 is a view showing a specific example of the copy resource management information in the Second Preferred Embodiment of the present invention.

DETAILED DESCRIPTION OF THE PREFERRED EMBODIMENTS

Figure 1:
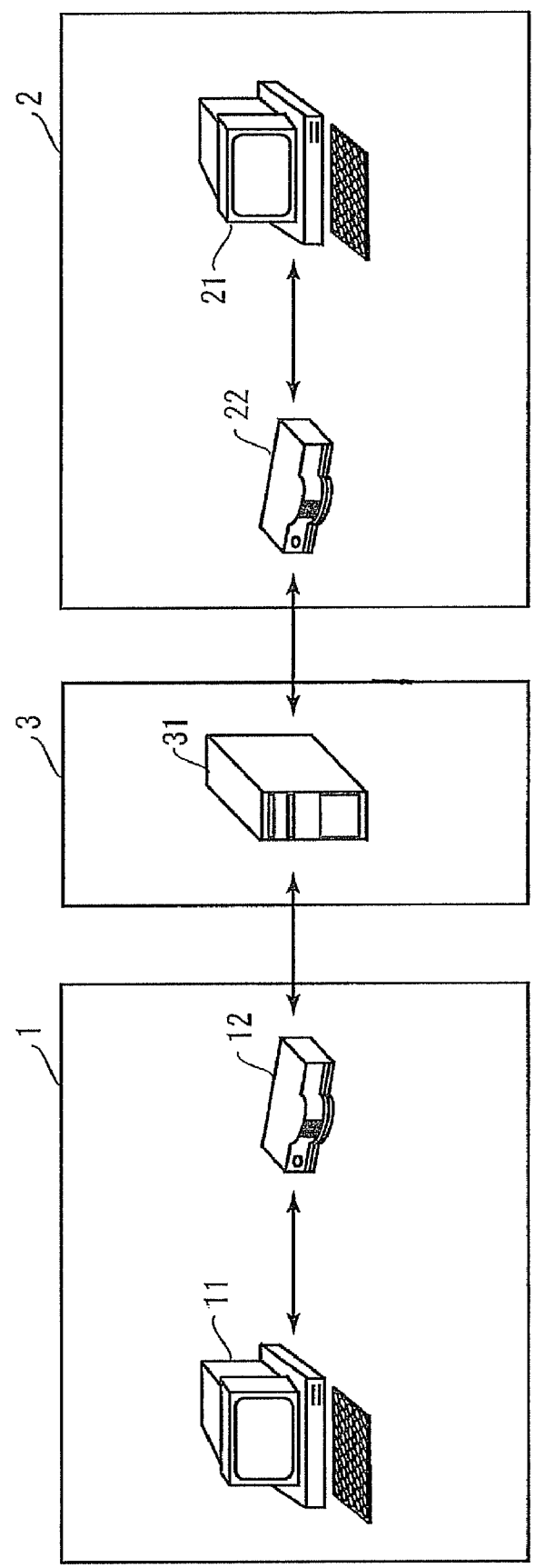
FIG. 1 is a view showing an overall configuration of a relay communication system in a First Preferred Embodiment of the present invention.

First Preferred Embodiment
(1) Overall Configuration of Relay Communication System A description will be made below of preferred embodiments of the present invention with reference to the drawings. FIG. 1 is a view showing an overall configuration of a relay communication system. The relay communication system preferably includes LANs 1 and 2 and a WAN 3. The LANs 1 and 2 are small-scale networks constructed remotely from each other. The WAN 3 is a large-scale network such as the Internet.

The LAN 1 preferably includes a client terminal 11 and a relay server 12. The LAN 2 preferably includes a client terminal 21 and a relay server 22. The WAN 3 preferably includes a SIP (Session Initiation Protocol) server 31.

The client terminals 11 and 21 preferably are personal computers and the like, for example. The relay servers 12 and 22 relay communication between the client terminals 11 and 21. The SIP server 31 relays communication between the relay servers 12 and 22.

In the present preferred embodiment, the SIP is preferably used as a communication protocol between the relay servers 12 and 22; however, protocols other than the SIP may be used. In the case of using protocols other than the SIP, the communication between the relay servers 12 and 22 may be directly executed.

In the respective sections between the client terminal 11 and the relay server 12, between the relay server 12 and the relay server 22, and between the relay server 22 and the client terminal 21, a plurality of call controls are sometimes executed, and a plurality of media sessions are sometimes established. However, in each of the sections, each of the call controls and each of the media sessions are allowed to correspond to each other based on identification information of each of the call controls. Accordingly, in each of the sections, the plurality of call controls do not cross over one another, and the plurality of media sessions do not cross over one another.

(2) Constituent Elements of Relay Server

Figures 2, 3:
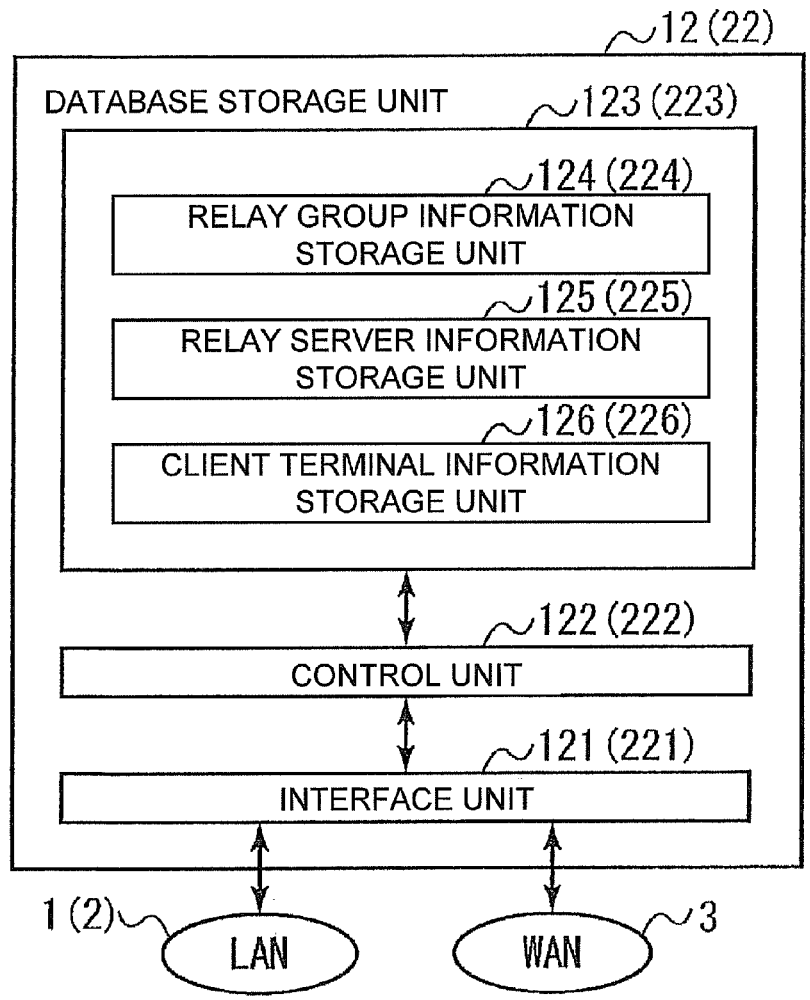
FIG. 2 is a view showing constituent elements of a relay server in the First Preferred Embodiment of the present invention.
FIG. 3 is a view showing a specific example of relay group information in the First Preferred Embodiment of the present invention.

FIG. 2 is a view showing constituent elements of the relay server 12(22). The relay server 12(22) preferably includes an interface unit 121(221), a control unit 122(222) and a database storage unit 123(223). Reference numerals which are not parenthesized are reference numerals for the relay server 12. Reference numerals which are parenthesized are reference numerals for the relay server 22.

The interface unit 121(221) performs communication with the client terminal 11(21) connected to the LAN 1 (2) through a private IP address. The interface unit 121(221) performs communication with the SIP server 31 connected to the WAN 3 through a global IP address.

The control unit 122(222) executes control for relaying the communication between the client terminal 11 and the client terminal 21. The control unit 122(222) creates or updates the information (to be described below) stored in the database storage unit 123(223).

The database storage unit 123(223) preferably includes a relay group information storage unit 124(224), a relay server information storage unit 125(225), and a client terminal information storage unit 126(226). A description is made below of specific examples of the above-mentioned information.

(3) Specific Example of Relay Group Information

FIG. 3 is a view showing a relay group information 40 as a specific example of the relay group information. The relay group information is an information indicating outlines of the relay servers that constitute the relay communication system.

The relay group information 40 preferably includes upper information 401 and lower information 402.

Upper information 401 is information regarding the relay group, which is an upper level. "id" indicates identification information of the relay group. "lastmod" indicates the latest update time of the relay group information. "name" indicates the name of the relay group.

The lower information 402 is information regarding the relay server, which is a lower level "id" indicates identification information of the relay server.

The relay group information 40 is stored in the relay group information storage unit 124 and 224. Specifically, the relay group information 40 is shared between the relay servers 12 and 22. Moreover, the relay group information 40 maybe shared between the relay servers 12 and 22 and the client terminals 11 and 21.

(4) Specific Example of Relay Server Information

FIG. 4 is a view showing a relay server information 50 as a specific example of the relay server information. The relay server information is an information indicating details of the relay servers that constitute the relay communication system, and is an information indicating outlines of the client terminals that constitute the relay communication system.

The relay server information 50 preferably includes upper information 501-1 and 501-2 and lower information 502-1 and 502-2. The upper information 501-1 and 501-2 include relay server activation information 503-1 and 503-2, respectively. The lower information 502-1 and 502-2, respectively, include client terminal site information 504-1 and 504-2 indicating as to whether or not the client terminals are logged in to the relay servers.

The upper information 501-1 and 501-2 are information regarding the relay servers, which are the upper level. "id" indicates identification information of the relay servers. "name" indicates the names of the relay servers. The relay server activation information 503-1 and 503-2 are information as to whether the relay servers are activated.

The lower information 502-1 and 502-2 are information regarding the client terminals, which are the lower level. "div" indicates the name of a division to which the client terminals belong. "group" indicates identification information of the relay group to which the client terminals belong. "id" indicates identification information of the client terminals. "name" indicates the names of the client terminals. The client terminal site information 504-1 and 504-2 indicate the identification information of the relay servers to which the client terminals have logged in.

The relay server information 50 is stored in the relay server information storage units 125 and 225. Specifically, the relay server information 50 is shared between the relay servers 12 and 22. Moreover, the relay server information 50 may be shared between the relay servers 12 and 22 and the client terminals 11 and 21.

When the relay servers are activated, the relay server activation information 503-1 and 503-2 become "active". When the relay servers are not activated, the relay server activation information 503-1 and 503-2 are blank. In such a way, the information as to whether or not the relay servers are activated is shared in the whole relay communication system.

When the client terminals are logged on to the relay servers, it is described in the client terminal site information 504-1 and 504-2. When the client terminals are not logged on to the relay servers, nothing is described in the client terminal site information 504-1 and 504-2. In such a way, the information as to whether or not the client terminals are logged on to the relay servers is shared in the whole relay communication system.

(5) Specific Example of Client Terminal Information

FIG. 5 is a view showing client terminal information 60 and 70 as specific examples of the client terminal information. The client terminal information is an information indicating details of the client terminals that constitute the relay communication system.

The client terminal information 60 and 70, respectively, include client terminal address information 601 and 701, client terminal expiration period information 602 and 702, and client terminal port information 603 and 703.

"div" indicates the name of a division to which the client terminals belong. "group" indicates identification information of the relay group to which the client terminals belong. Client terminal address information 601 and 701 indicate IP addresses of the client terminals. The client terminal expiration period information 602 and 702 indicate registration expiration periods of the client terminals. "id" indicates identification information of the client terminals. "name" indicates the names of the client terminals. "pass" indicates passwords of the client terminals. The client terminal port information 603 and 703 indicate port numbers of the client terminals.

The client terminal information 60 is stored only in the client terminal information storage unit 126, and the client terminal information 70 is stored only in the client terminal information storage unit 226. In other words, the client terminal information 60 is owned only by the relay server 12, and the client terminal information 70 is owned only by the relay server 22.

(6) Flow of Information Sharing

Figure 6:
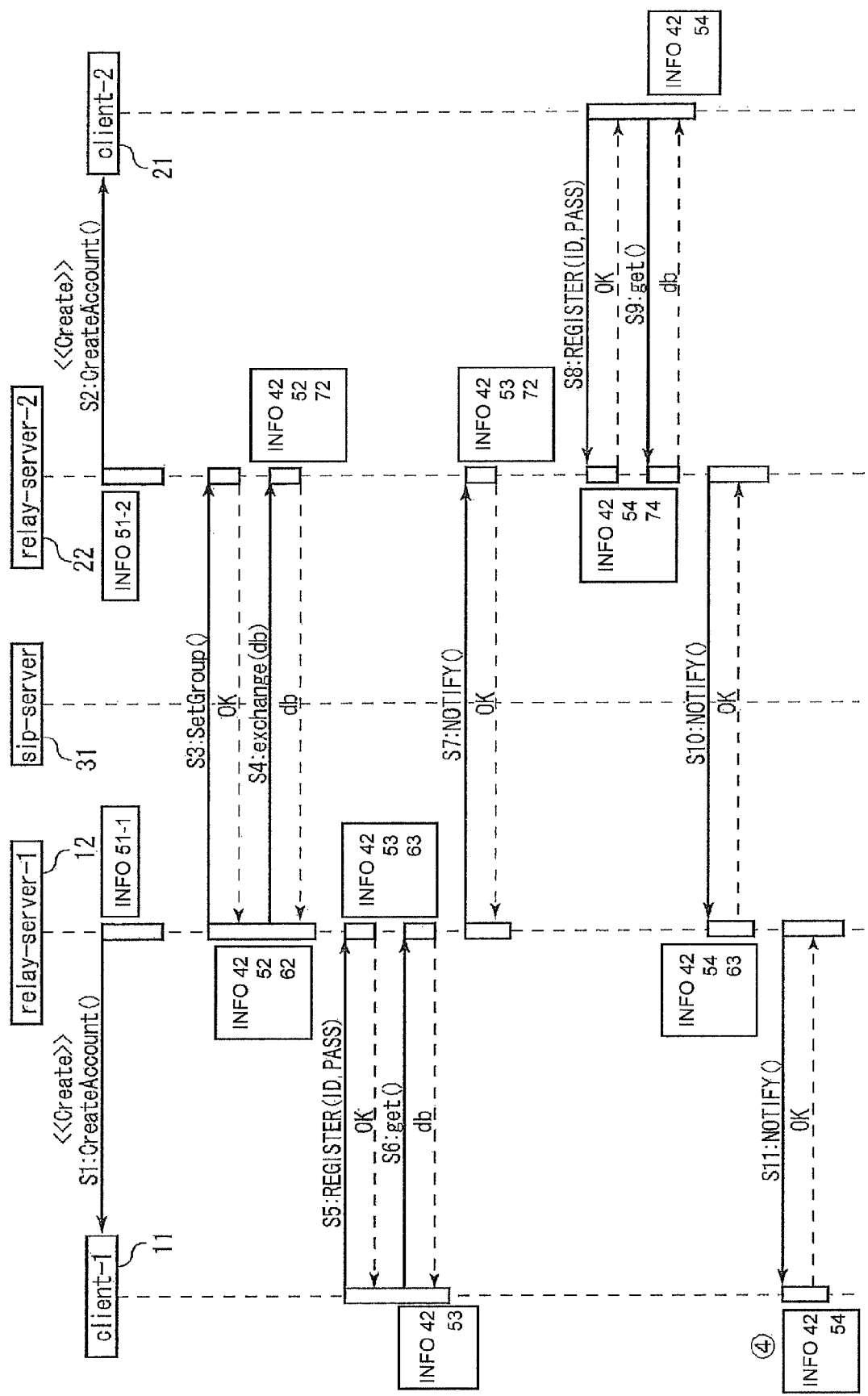
FIG. 6 is a view showing a flow of information sharing in the First Preferred Embodiment of the present invention.

FIG. 6 is a view showing a process flow in which the relay group information and the relay server information are shared. The relay servers 12 and 22 join in the relay communication system. A user of the client terminal 11 logs on to the relay server 12, and a user of the client terminal 21 logs on to the relay server 22.

(6-1) Process Flow from Step S1 to Step S2

An administrator of the relay server 12 and an administrator of the relay server 22 make a contract to construct a group of the relay communication system between the LANs 1 and 2.

The administrator of the relay server 12 creates an account for the user of the client terminal 11 (Step S1: CreateAccount( )). The control unit 122 creates a relay server information 51-1, and stores the relay server information 51-1 in the relay server information storage unit 125.

The administrator of the relay server 22 creates an account for the user of the client terminal 21 (Step S2: CreateAccount( )). The control unit 222 creates a relay server information 51-2, and stores the relay server information 51-2 in the relay server information storage unit 225.

Through the above-described process, the relay server 12 owns the relay server information 51-1. The relay server 22 owns the relay server information 51-2.

The contents in the first frame in FIG. 7 illustrate the relay server information 51-1. Upper information 511-1 is the information regarding the relay server 12, which is the upper level. As "id", "relay-server-1@abc.net" is set. As "name", "RELAY SERVER 1" is set. As relay server activation information 513-1, "active" is set. In other words, the relay server 12 is activated.

Lower information 512-1 is the information regarding the client terminal 11, which is the lower level. As "div", "software" is set. As "group", "20070402133100@relay-server-1.abc.net" is set. As "id", "client-1@relay-server-1.abc.net" is set. As "name", "CLIENT 1" is set. Client terminal site information 514-1 is blank. In other words, the user of the client terminal 11 is not logged on to the relay server 12.

The contents in the second frame in FIG. 7 illustrate the relay server information 51-2. Upper information 511-2 is the information regarding the relay server 22, which is the upper level. As "id", "relay-server-2@abc.net" is set. As "name", "RELAY SERVER 2" is set. As relay server activation information 513-2, "active" is set. In other words, the relay server 22 is activated.

Lower information 512-2 is the information regarding the client terminal 21, which is the lower level. As "div", "software" is set. As "group", "20070402133100@relay-server-1.abc.net" is set. As "id", "client-2@relay-server-2.abc.net" is set. As "name", "CLIENT 2" is set. Client terminal site information 514-2 is blank. In other words, the user of the client terminal 21 is not logged on to the relay server 22.

(6-2) Process Flow from Step S3 to Step S4

In the following description, the communication between the relay servers 12 and 22 is relayed by the SIP server 31. A description is made of a method in which the relay server 12(22) performs the communication with the relay server 22(12) through the SIP server 31.

The relay server 12(22) transmits, to the SIP server 31, data in which the account of the relay server 22(12) is designated as the communication destination, and the like. The SIP server 31 allows the accounts of the relay servers 12 and 22 to correspond to the global IP addresses of the relay servers 12 and 22, respectively. The SIP server 31 acquires the global IP address of the relay server 22(12) based on the account of the relay server 22(12). The SIP server 31 then transmits, to the relay server 22(12), data in which the global IP address of the relay server 22(12) is designated as the communication destination, and the like.

The relay server 12 requests the relay server 22 to construct the group of the relay communication system (Step S3: SetGroup( )). The control unit 122 creates a relay group information 42, and stores the relay group information 42 in the relay group information storage unit 124. The control unit 222 creates a relay group information 42, and stores the relay group information 42 in the relay group information storage unit 224.

The relay server 12 requests the relay server 22 to exchange the relay server information therewith (Step S4: exchange (db)). The relay server 12 transmits a copy of the relay server information 51-1 to the relay server 22. The relay server 22 transmits a copy of the relay server information 51-2 to the relay server 12.

The control unit 122 synthesizes the copy of the relay server information 51-2 and the relay server information 51-1, thereby creates relay server information 52, and stores the relay server information 52 in the relay server information storage unit 125. The control unit 222 synthesizes the copy of the relay server information 51-1 and the relay server information 51-2, thereby creates relay server information 52, and stores the relay server information 52 in the relay server information storage unit 225.

The control unit 122 creates client terminal information 62, and stores the client terminal information 62 in the client terminal information storage unit 126. The control unit 222 creates client terminal information 72, and stores the client terminal information 72 in the client terminal information storage unit 226. Creation process and storing process for the client terminal information 62 are executed in Step S1, and creation process and storing process for the client terminal information 72 are executed in Step S2.

Through the above-described process, the relay server 12 owns the relay group information 42, the relay server information 52 and the client terminal information 62. The relay server 22 owns the relay group information 42, the relay server information 52 and the client terminal information 72. The relay group information 42 and the relay server information 52 are shared between the relay servers 12 and 22.

The contents in the first frame in FIG. 8 illustrate the relay group information 42. Upper information 421 is the information regarding the relay group, which is the upper level. As "id", "20070402133100@relay-server-1.abc.net" is set. As "lastmod", "20070402133100" is set. As "name", "GROUP 1" is set.

Lower information 422 is the information regarding the relay servers 12 and 22, which is the lower level. As "id", "relay-server-1@abc.net" and "relay-server-2@abc.net" are set.

The contents in the second frame in FIG. 8 illustrate the relay server information 52. Upper information 521-1 and 521-2 are similar to the upper information 511-1 and 511-2 in FIG. 7, respectively. Lower information 522-1 and 522-2 are similar to the lower information 512-1 and 512-2 in FIG. 7, respectively.

The contents in the third frame in FIG. 8 illustrate the client terminal information 62. As "div", "software" is set. As "group", "20070402133100@relay-server-1.abc.net" is set. As "id", "client-1@relay-server-1.abc.net" is set. As "name", "CLIENT 1" is set. As "pass", "client-1" is set.

Client terminal address information 621 is blank. As client terminal expiration period information 622, "0" is set. Client terminal port information 623 is blank. In other words, the user of the client terminal 11 is not logged on to the relay server 12.

The contents in the fourth frame in FIG. 8 illustrate the client terminal information 72. As "div", "software" is set. As "group", "20070402133100@relay-server-1.abc.net" is set. As "id", "client-2@relay-server-2.abc.net" is set. As "name", "CLIENT 2" is set. As "pass", "client-2" is set.

Client terminal address information 721 is blank. As client terminal expiration period information 722, "0" is set. Client terminal port information 723 is blank. In other words, the user of the client terminal 21 is not logged on to the relay server 22.

(6-3) Process Flow from Step S5 to Step S7

The user of the client terminal 11 inputs "client-1@relay-server-1.abc.net" as the identification information of the client terminal 11, and inputs "client-1" as the password of the client terminal 11. The user of the client terminal 11 logs on to the relay server 12 (Step S5: REGISTER (ID, PASS)). The control unit 122 performs authentication of the user of the client terminal 11 by referring to the client terminal information 62.

The control unit 122 receives the login of the user of the client terminal 11. The control unit 122 then updates the relay server information 52, thereby creates relay server information 53, and stores the relay server information 53 in the relay server information storage unit 125. The control unit 122 updates the client terminal information 62, thereby creates client terminal information 63, and stores the client terminal information 63 in the client terminal information storage unit 126. The control unit 122 does not update the relay group information 42.

The client terminal 11 requests the relay server 12 to provide it with the relay group information and the relay server information (Step S6: get( )). The relay server 12 then transmits copies of the relay group information 42 and the relay server information 53 to the client terminal 11. The client terminal 11 stores the relay group information 42 and the relay server information 53.

By referring to the relay group information 42 and the relay server information 53, the control unit 122 determines a relay server which is to be notified that the relay server information 52 has been updated to the relay server information 53. The control unit 122 determines the relay server 22, in which relay server activation information 533-2 of the relay server information 53 is "active", as the relay server to be notified of the above-described update of the information.

The relay server 12 then notifies the relay server 22 that the relay server information 52 has been updated to the relay server information 53 (Step S7: NOTIFY( )). In response, the control unit 222 updates the relay server information 52, thereby creates the relay server information 53, and stores the relay server information 53 in the relay server information storage unit 225.

By referring to the client terminal information 72, the control unit 222 determines a client terminal which is to be notified that the relay server information 52 has been updated to the relay server information 53. The control unit 222 does not determine the client terminal 21, in which the client terminal address information 721 and the client terminal port information 723 of the client terminal information 72 are blank, as the client terminal to be notified of the update of the information.

Through the above-described process, the relay server 12 owns the relay group information 42, the relay server information 53 and the client terminal information 63. The relay server 22 owns the relay group information 42, the relay server information 53 and the client terminal information 72. The client terminal 11 owns the relay group information 42 and the relay server information 53. The relay group information 42 and the relay server information 53 are shared between the relay servers 12 and 22 and the client terminal 11.

The contents in the first frame in FIG. 9 illustrate the relay group information 42. In the process flow from Step S5 to Step S7, no new relay server has joined the relay communication system, and accordingly, the relay group information 42 is not updated.

The contents in the second frame in FIG. 9 illustrate the relay server information 53. The updated portions are underlined. The user of the client terminal 11 is logged on to the relay server 12. Therefore, client terminal site information 534-1 of lower information 532-1 is determined at "relay-server-1@abc.net".

The contents in the third frame in FIG. 9 illustrate the client terminal information 63. The updated portions are underlined. The user of the client terminal 11 is logged on to the relay server 12. Therefore, client terminal address information 631 is determined at "192.168.10.2". Moreover, client terminal expiration period information 632 is determined at "1213935960484". Furthermore, client terminal port information 633 is determined at "5070".

The contents in the fourth frame in FIG. 9 illustrate the client terminal information 72. In the process flow from Step S5 to Step S7, the user of the client terminal 21 has not logged on to the relay server 22, and accordingly, the client terminal information 72 is not updated.

(6-4) Process Flow from Step S8 to Step S11

The user of the client terminal 21 inputs "client-2@relay-server-2.abc.net" as the identification information of the client terminal 21, and inputs "client-2" as the password of the client terminal 21. The user of the client terminal 21 logs on to the relay server 22 (Step S8: REGISTER (ID, PASS)). The control unit 222 performs authentication of the user of the client terminal 21 by referring to the client terminal information 72.

The control unit 222 receives the login of the user of the client terminal 21. The control unit 222 then updates the relay server information 53, thereby creates relay server information 54, and stores the relay server information 54 in the relay server information storage unit 225. The control unit 222 updates the client terminal information 72, thereby creates client terminal information 74, and stores the client terminal information 74 in the client terminal information storage unit 226. The control unit 222 does not update the relay group information 42.

The client terminal 21 requests the relay server 22 to provide it with the relay group information and the relay server information (Step S9: get( )). The relay server 22 then transmits copies of the relay group information 42 and the relay server information 54 to the client terminal 21. The client terminal 21 stores the relay group information 42 and the relay server information 54.

By referring to the relay group information 42 and the relay server information 54, the control unit 222 determines a relay server which is to be notified that the relay server information 53 has been updated to the relay server information 54. The control unit 222 determines the relay server 12, in which relay server activation information 543-1 of the relay server information 54 is "active", as the relay server to be notified of the above-described update of the information.

The relay server 22 then notifies the relay server 12 that the relay server information 53 has been updated to the relay server information 54 (Step S10: NOTIFY( )). In response, the control unit 122 updates the relay server information 53, thereby creates the relay server information 54, and stores the relay server information 54 in the relay server information storage unit 125.

By referring to the client terminal information 63, the control unit 122 determines a client terminal which is to be notified that the relay server information 53 has been updated to the relay server information 54. The control unit 122 determines the client terminal 11, in which the client terminal address information 631 and the client terminal port information 633 of the client terminal information 63 have been determined already, as the client terminal to be notified of the update of the information.

The relay server 12 notifies the client terminal 11 that the relay server information 53 has been updated to the relay server information 54 (Step S11: NOTIFY( )). The client terminal 11 then updates the relay server information 53, thereby creates the relay server information 54, and stores the relay server information 54.

Through the above-described process, the relay server 12 owns the relay group information 42, the relay server information 54 and the client terminal information 63. The relay server 22 owns the relay group information 42, the relay server information 54 and the client terminal information 74. The client terminal 11 owns the relay group information 42 and the relay server information 54. The client terminal 21 owns the relay group information 42 and the relay server information 54. The relay group information 42 and the relay server information 54 are shared between the relay servers 12 and 22 and the client terminals 11 and 21.

The contents in the first frame in FIG. 10 illustrate the relay group information 42. In the process flow from Step S8 to Step S11, no new relay server has joined the relay communication system, and accordingly, the relay group information 42 is not updated.

The contents in the second frame in FIG. 10 illustrate the relay server information 54. The updated portions are underlined. The user of the client terminal 21 is logged on to the relay server 22. Therefore, client terminal site information 544-2 of lower information 542-2 is determined at "relay-server-2@abc.net".

The contents in the third frame in FIG. 10 illustrate the client terminal information 63. In the process flow from Step S8 to Step S11, the user of the client terminal 11 has not logged off from the relay server 12, and accordingly, the client terminal information 63 is not updated.

The contents in the fourth frame in FIG. 10 illustrate the client terminal information 74. The updated portions are underlined. The user of the client terminal 21 is logged on to the relay server 22. Therefore, client terminal address information 741 is determined at "192.168.1.10". Moreover, client terminal expiration period information 742 is determined at "1213935978484". Furthermore, client terminal port information 743 is determined at "5070".

(7) Summary of the Information Sharing

In the relay communication system, the changes in the number and the connection state of the LANs and the client terminals are sometimes changed. Accordingly, when having recognized such changes, one of the relay servers immediately updates the relay group information, the relay server information and the client terminal information.

Then, the one of the relay servers immediately notifies the other relay server, which is described in the relay group information and the relay server information, that the relay group information and the relay server information have been updated. Moreover, the one of the relay servers immediately notifies the client terminal, which is described in the client terminal information, that the relay group information and the relay server information have been updated.

However, even if the other relay server is described in the relay group information and the relay server information, the one of the relay servers does not immediately notify the other relay server of the above-described update of the information upon having determined that the other relay server is in an unconnected state. Moreover, even if the client terminal information is described in the client terminal information, the one of the relay servers does not immediately notify the client terminal of the update of the information upon having determined that the client terminal is in an unconnected state.

In such a way, the information regarding the changes in the number and the connection state of the LANs and the client terminals is shared in the whole relay communication system in real time.

(8) Flow of Data Transmission/Reception

Figure 11:
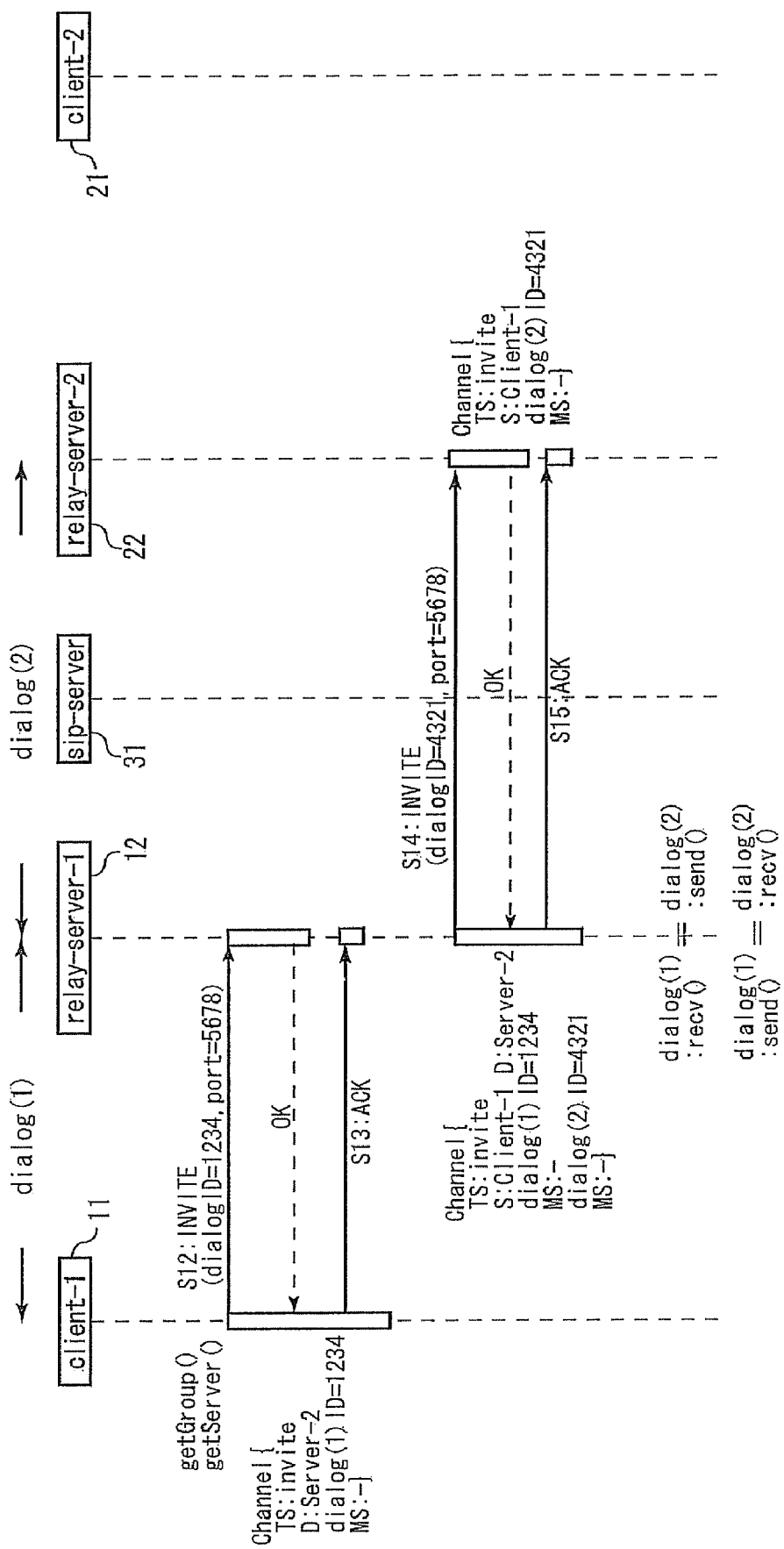
FIG. 11 is a view showing the flow of the data transmission/reception in the First Preferred Embodiment of the present invention.
Figure 12:
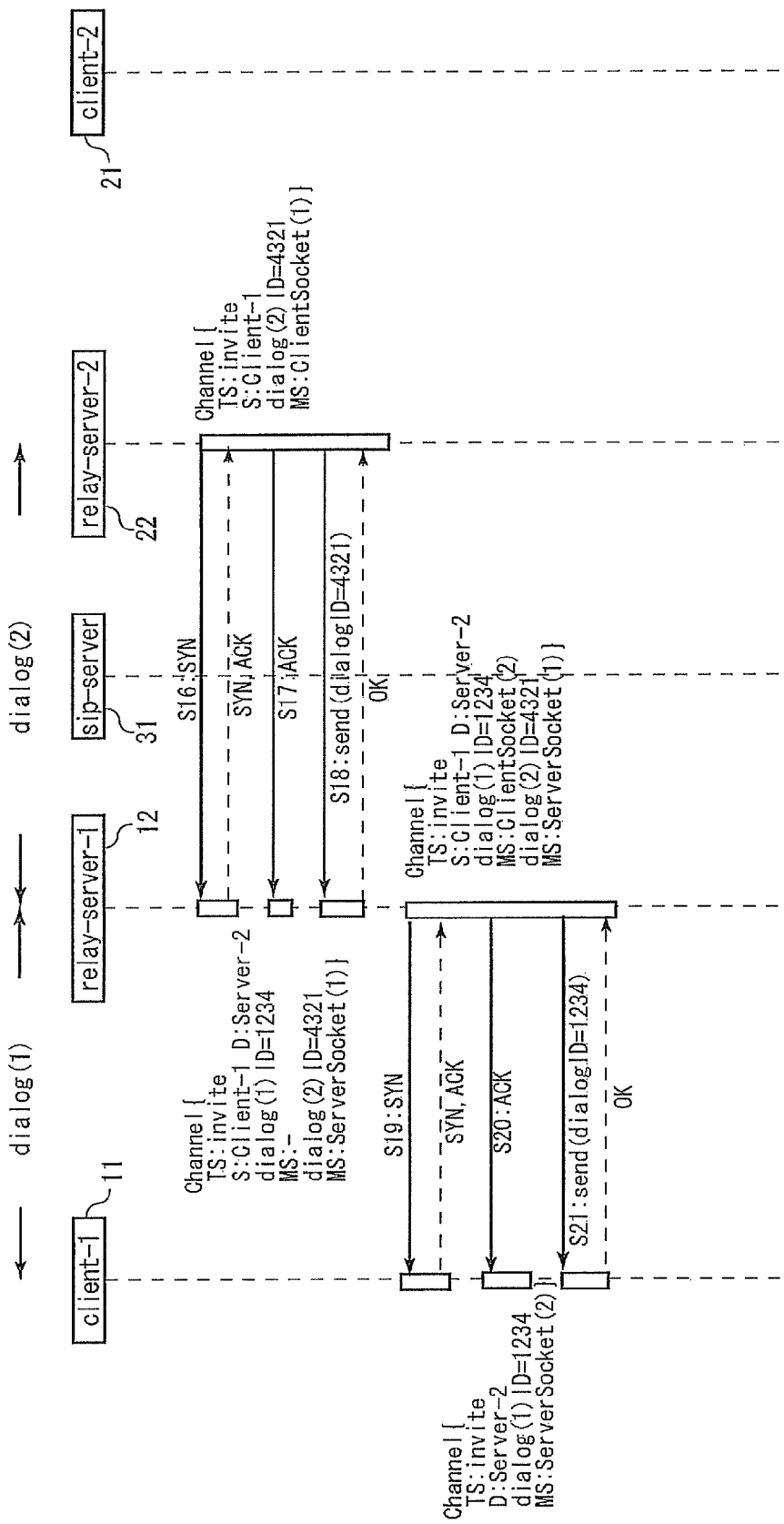
FIG. 12 is a view showing the flow of the data transmission/reception in the First Preferred Embodiment of the present invention.
Figure 13:
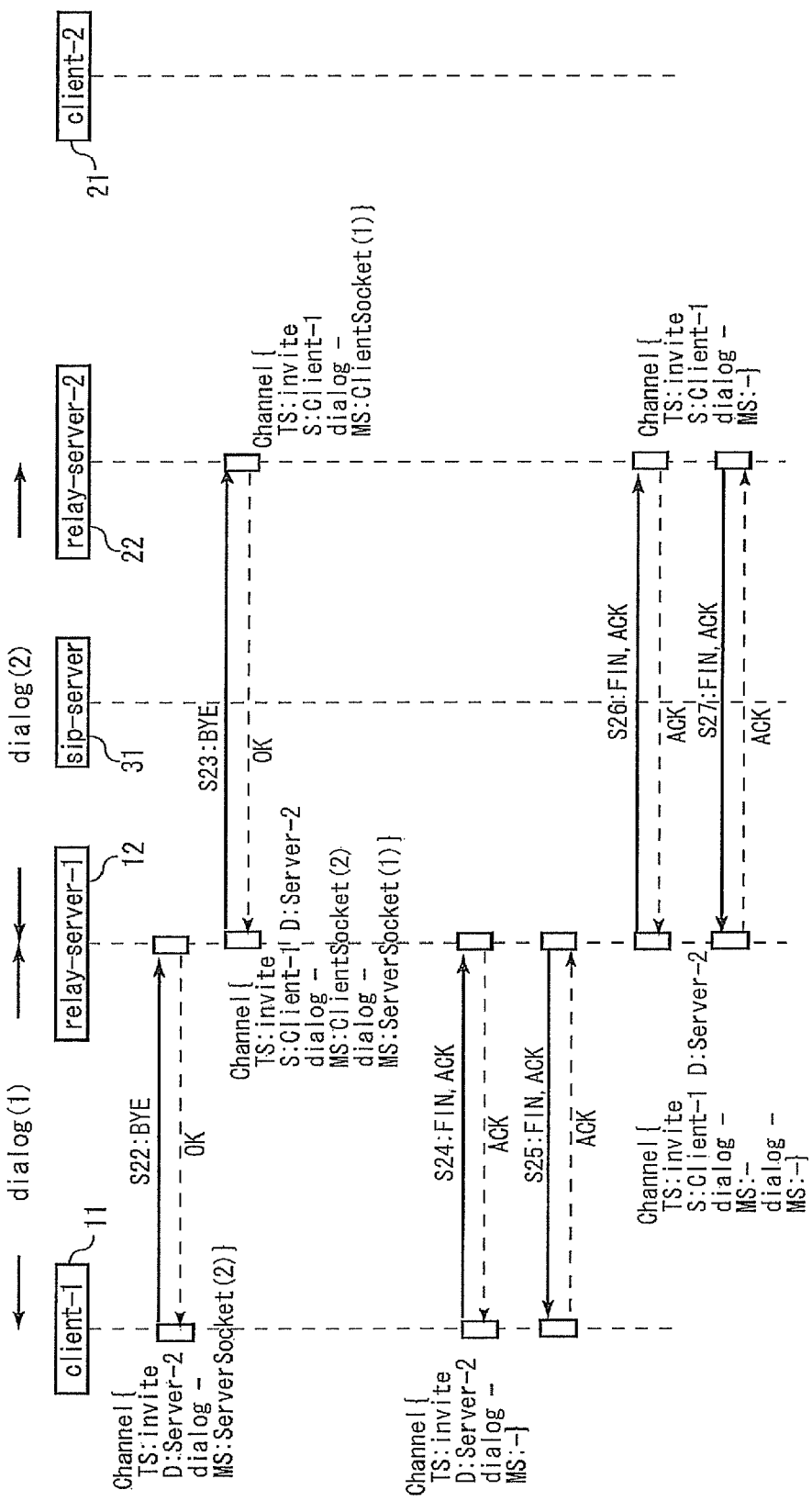
FIG. 13 is a view showing the flow of the data transmission/reception in the First Preferred Embodiment of the present invention.
Figure 14:
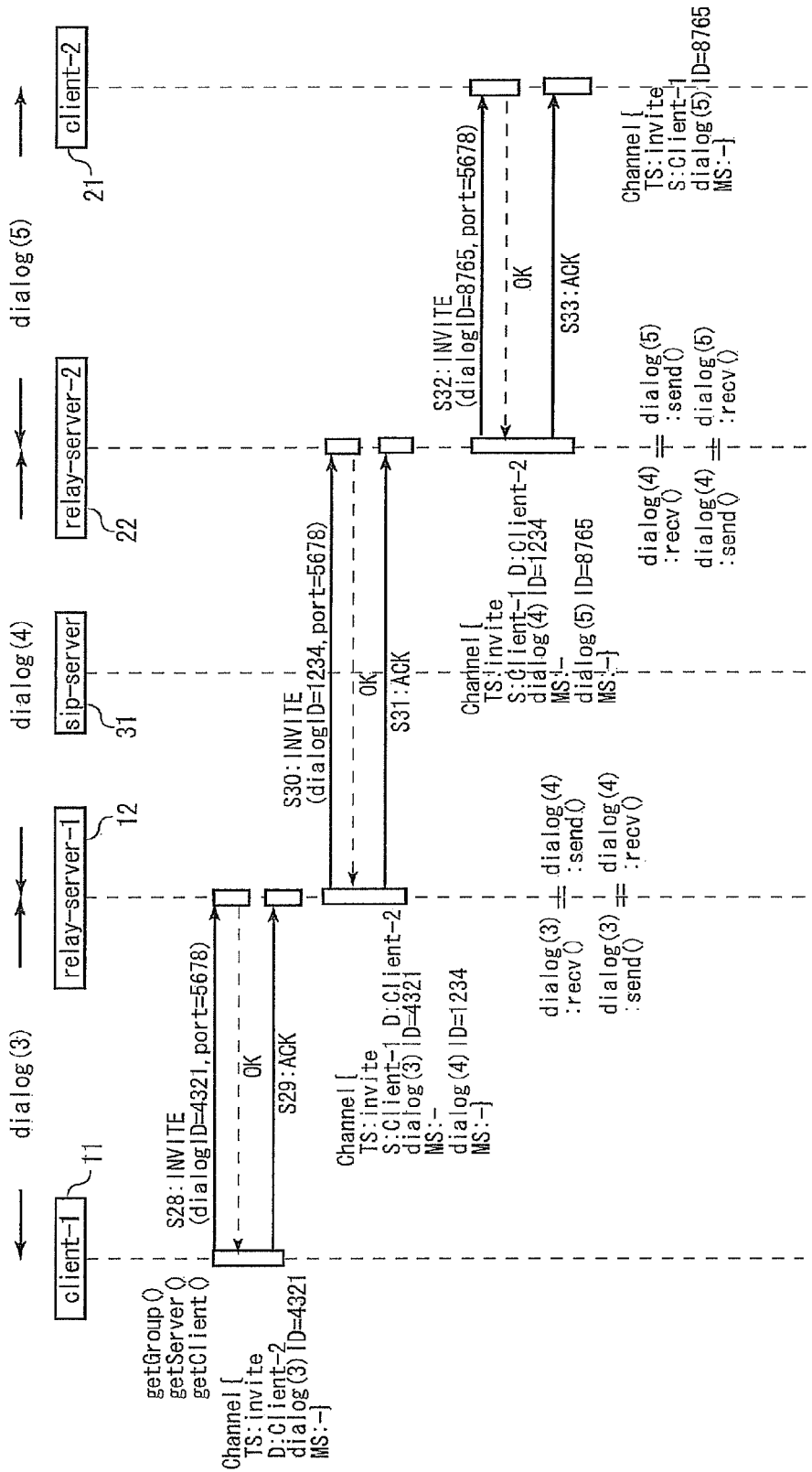
FIG. 14 is a view showing the flow of the data transmission/reception in the First Preferred Embodiment of the present invention.
Figure 15:
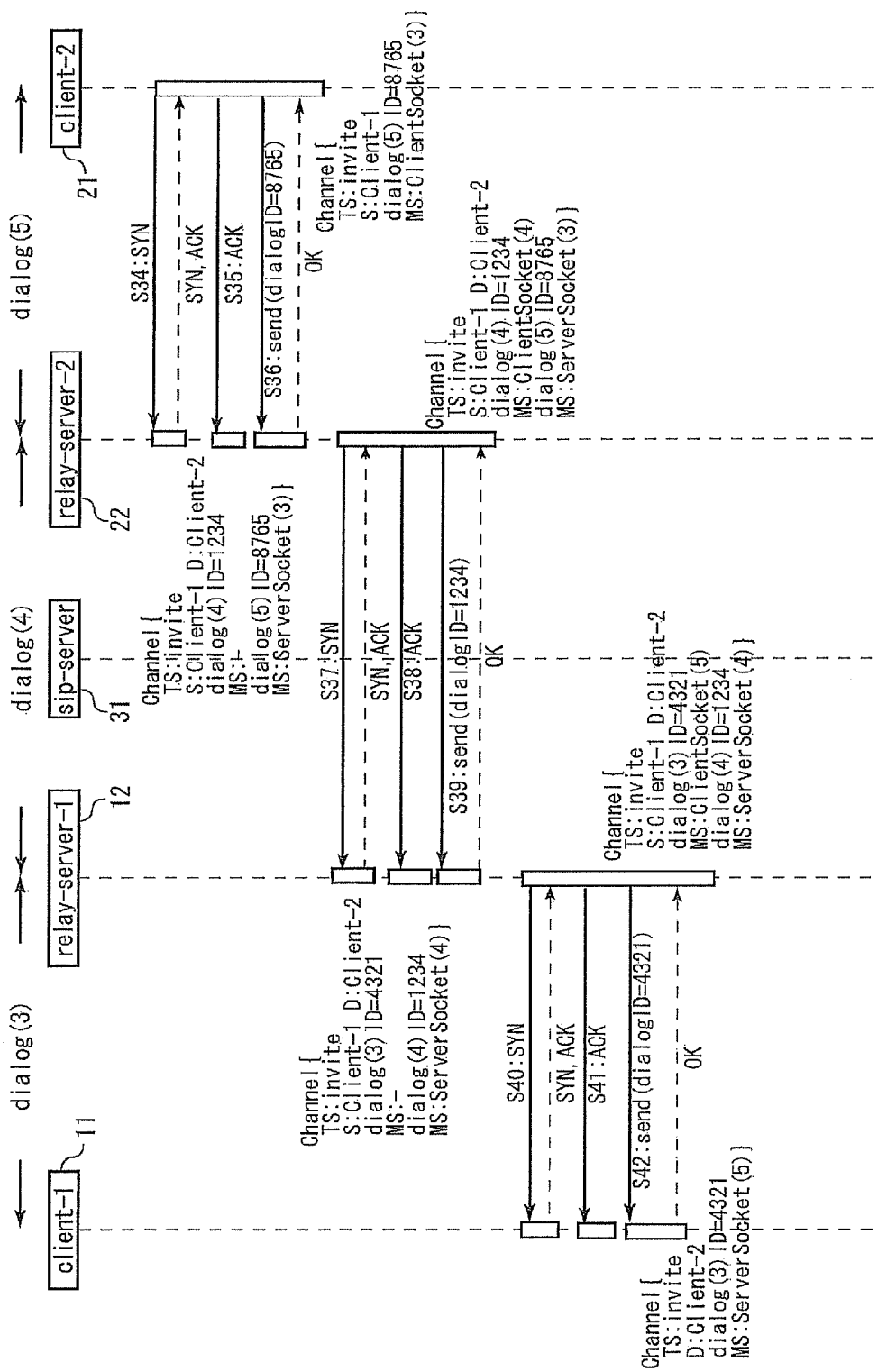
FIG. 15 is a view showing the flow of the data transmission/reception in the First Preferred Embodiment of the present invention.
Figure 16:
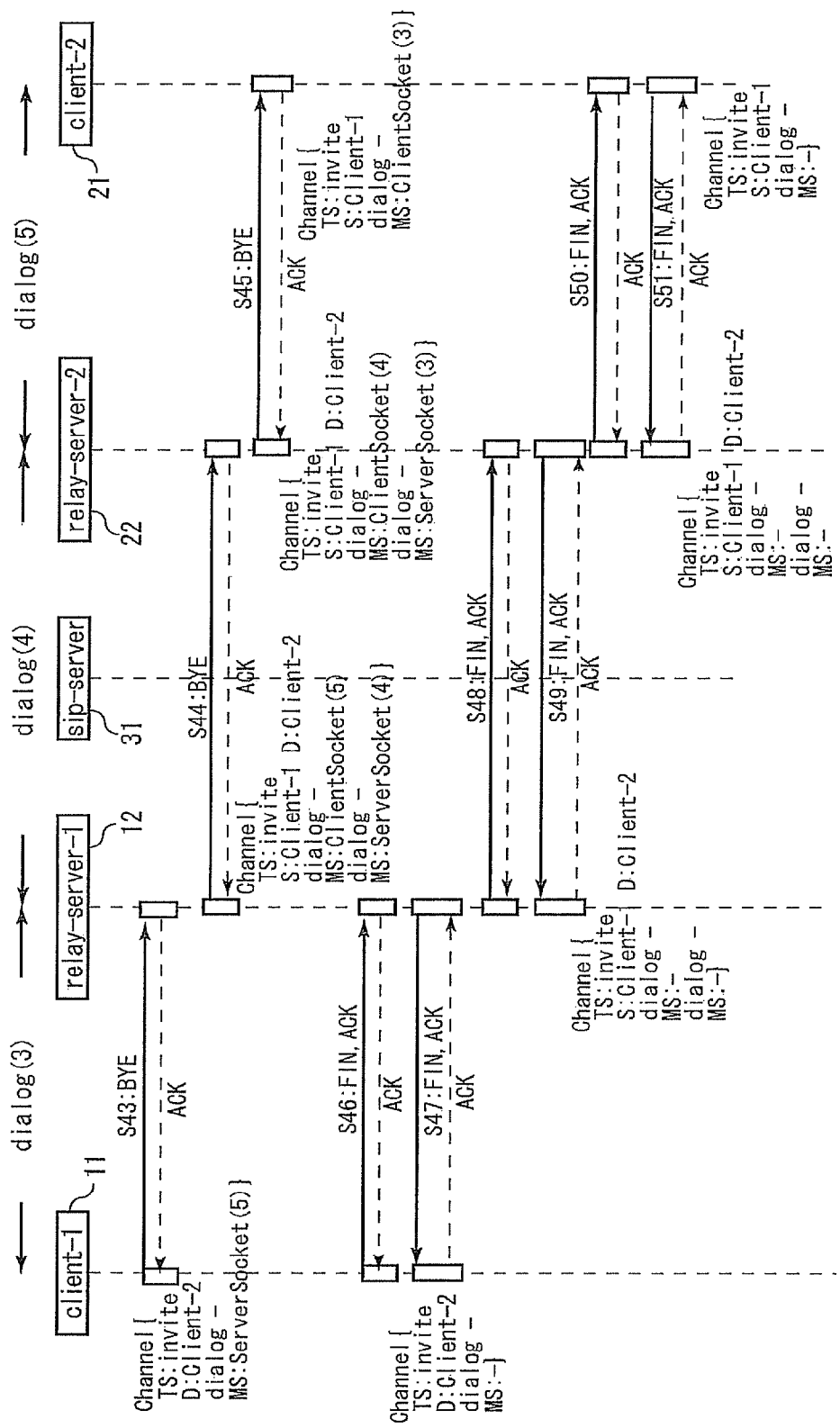
FIG. 16 is a view showing the flow of the data transmission/reception in the First Preferred Embodiment of the present invention.

FIG. 11 to FIG. 13 are views showing a flow of data transmission/reception between the client terminal 11 and the relay server 22. FIG. 14 to FIG. 16 are views showing a flow of data transmission/reception between the client terminal 11 and the client terminal 21.

In FIG. 11 to FIG. 13 and FIG. 14 to FIG. 16, the relay group information 42, the relay server information 54 and the client terminal information 63 and 74, which are shown in FIG. 10, are stored. The user of the client terminal 11 has logged on to the relay server 12. The user of the client terminal 21 has logged on to the relay server 22.

The data transmission/reception between the client terminal 11 and the relay server 22 and the data transmission/reception between the client terminal 11 and the client terminal 21 are executed in parallel to each other. First, the data transmission/reception between the client terminal 11 and the relay server 22 will be described. Next, the data transmission/reception between the client terminal 11 and the client terminal 21 will be described. Finally, a description will be made with respect to the data transmissions/receptions executed in parallel to each other.

(9) Data Transmission/Reception Between the Client Terminal 11 and the Relay Server 22

(9-1) Call Control Before Establishing the Media Session

FIG. 11 is a view showing a flow of the call control before the media session is established in the data transmission/reception between the client terminal 11 and the relay server 22. The user of the client terminal 11 confirms the relay group to which the client terminal 11 belongs. Specifically, the user of the client terminal 11 causes the relay group information 42 to be displayed on a display screen of the client terminal 11 (getGroup( )). In the relay group information 42, "relay-server-1@abc.net" and "relay-server-2@abc.net", which are identification information of the relay servers 12 and 22, are set. The user of the client terminal 11 confirms that the client terminal 11 belongs to the relay group composed of the relay servers 12 and 22.

The user of the client terminal 11 causes the relay server information 54 that corresponds to the relay group information 42, to be displayed on the display screen of the client terminal 11 (getServer( )). The user of the client terminal 11 refers to the relay server information 54 and confirms the relay servers, that constitute the relay group, and the client terminals located below the relay servers.

The user of the client terminal 11 refers to the relay server information 54, and confirms that transmission/reception of the data with the relay server 22 is possible.

The user of the client terminal 11 confirms that, with regard to the relay server 12, relay server activation information 543-1 of the relay server information 54 is set at "active". In other words, the user of the client terminal 11 confirms that the relay server 12 is activated.

The user of the client terminal 11 confirms that, with regard to the relay server 22, relay server activation information 543-2 of the relay server information 54 is set at "active". In other words, the user of the client terminal 11 confirms that the relay server 22 is activated.

The user of the client terminal 11 confirms that the data can be transmitted to the relay server 22 through the relay server 12. The user of the client terminal 11 then decides to transmit the data to the relay server 22.

The client terminal 11 performs the call control for the relay server 12 in the communication (dialog(1)) between the client terminal 11 and the relay server 12 (Step S12: INVITE). Here, the client terminal 11 transmits "1234" to the relay server 12 as identification information of the call control in the dialog(1). Moreover, the client terminal 11 transmits "5678" to the relay server 12 as a port number of the media session.

Between the client terminal 11 and the relay server 12, the plurality of call controls are sometimes executed as will be described later. Accordingly, pieces of identification information, which are different from one another, are assigned to the plurality of call controls so that the plurality of call controls can be identified.

In FIG. 11 to FIG. 13, information on channel for use in the respective terminals and servers is shown. Among such channel information, "TS" indicates Transaction, "S" indicates Source (transmission source), "D" indicates Destination (transmission destination), and MS indicates MediaSession. Moreover, in Destination, relay-server-2 is simply described as Server2.

In the channel used by the client terminal 11, "1234" is set as ID of the dialog(1). Since the media session has not been established, the column of MS is blank.

In the dialog(1), the relay server 12 undergoes the call control performed by the client terminal 11. The relay server 12 then transmits an OK response to the client terminal 11. The client terminal 11 that has received the OK response transmits an ACK to the relay server 12 (Step S13).

The control unit 122 refers to the lower information 422 of the relay group information 42 or upper information 541-2 of the relay server information 54 and thereby confirms that the relay server 22, which is the execution destination of the call control, is not on the LAN 1 side but on the WAN 3 side.

In the communication (dialog(2)) between the relay server 12 and the relay server 22, the relay server 12 performs the call control for the relay server 22 (Step S14: INVITE). Here, the relay server 12 transmits "4321" to the relay server 22 as identification information of the call control in the dialog(2). Moreover, the relay server 12 transmits "5678" to the relay server 22 as the port number of the media session.

Between the relay server 12 and the relay server 22, the plurality of call controls are sometimes executed as will be described later. Accordingly, pieces of identification information, which are different from one another, are assigned to the plurality of call controls so that the plurality of call controls can be identified.

However, between the client terminal 11 and the relay server 12, and between the relay server 12 and the relay server 22, the call controls are executed independently of each other. Accordingly, between the client terminal 11 and the relay server 12, and between the relay server 12 and the relay server 22, even if a same identification information in between is used for call controls, the call controls independent of each other can be identified.

In the channel used by the relay server 12, "1234" as ID of the dialog(1) and "4321" as ID of the dialog(2) are set. Since the media session has not been established, either of the columns of MS is blank.

In the dialog(2), the relay server 22 undergoes the call control performed by the relay server 12. The relay server 22 then transmits an OK response to the relay server 12. The relay server 12 that has received the OK response transmits an ACK to the relay server 22 (Step S15).

The dialog(1) is the communication between the client terminal 11 and the relay server 12. The dialog(2) is the communication between the relay server 12 and the relay server 22. The relay server 12 associates the dialog(1) and the dialog(2) with each other.

When having received the data in the dialog(1), the relay server 12 creates the information indicating that the dialog(1) and the dialog(2) are associated with each other, and then transmits the data in the dialog(2). In this transmission/reception, such an association between the dialog(1) and the dialog (2) is represented by "dialog(1): recv( )=dialog(2): send( )".

When having received the data in the dialog(2), the relay server 12 refers to the information indicating that the dialog (1) and the dialog(2) are associated with each other, and then transmits the data in the dialog(1). In this transmission/reception, such an association between the dialog(1) and the dialog (2) is represented by "dialog(1): send( )=dialog(2): recv( )".

In the channel used by the relay server 22, "4321" is set as ID of the dialog (2). Since the media session has not been established, the column of MS is blank.

(9-2) Media Session Establishment

FIG. 12 is a view showing a flow of the media session establishment in the data transmission/reception between the client terminal 11 and the relay server 22. The side that has received the call control performs the media session establishment. The side that has performed the call control undergoes the media session establishment.

The side that performs the call control transmits identification information of the call control to the side that undergoes the call control. The side that has undergone the call control transmits the received identification information of the call control to the side that has performed the call control. The side that has performed the call control collates the received identification information of the call control with the transmitted identification information of the call control. The side that has performed the call control can authenticate that the side that has undergone the call control and the side that has performed the media session establishment match each other.

The relay server 22 requests the relay server 12 to establish the media session (Step S16: SYN). The relay server 12 returns a SYN and an ACK to the relay server 22. The relay server 22 transmits an ACK to the relay server 12 (Step S17).

Next, the relay server 22 transmits "4321" as the identification information of the call control to the relay server 12 through the media session (Step S18: send). The relay server 12 collates the identification information of the call control received in Step S18 with the identification information of the call control transmitted in Step S14.

The relay server 12 authenticates that the relay server that has performed the media session establishment request in Step S16 matches the relay server 22 that has undergone the call control in Step S14. In other words, the relay server 12 has not received an illegitimate media session establishment request from the relay server 22 in Step S16. The relay server 12 then transmits an OK response to the relay server 22.

In the information on the channel used by the relay server 22, ClientSocket(1) is set as the media session associated with the dialog(2). In the information on the channel used by the relay server 12, ServerSocket(1) is set as the media session associated with the dialog(2).

Subsequently, the relay server 12 requests the client terminal 11 to establish the media session (Step S19: SYN). The client terminal 11 returns a SYN and an ACK to the relay server 12. The relay server 12 transmits an ACK to the client terminal 11 (Step S20).

Next, the relay server 12 transmits "1234" as the identification information of the call control to the client terminal 11 through the media session (Step S21: send). The client terminal 11 collates the identification information of the call control received in Step S21 with the identification information of the call control transmitted in Step S12.

The client terminal 11 authenticates that the relay server that has performed the media session establishment request in Step S19 matches the relay server 12 that has undergone the call control in Step S12. In other words, the client terminal 11 has not received an illegitimate media session establishment request from the relay server 12 in Step S19. The client terminal 11 then transmits an OK response to the relay server 12.

In the information on the channel used by the relay server 12, ClientSocket(2) is further set as the media session associated with the dialog(1). In the information on the channel used by the client terminal 11, ServerSocket(2) is set as the media session associated with the dialog(1).

Through the above-described process, the media sessions are established between the relay server 22 and the relay server 12, and between the relay server 12 and the client terminal 11.

(9-3) Media Session Disconnection

FIG. 13 is a view showing a flow of media session disconnection in the data transmission/reception between the client terminal 11 and the relay server 22.

In the dialog(1), the client terminal 11 requests the relay server 12 to disconnect the session (Step S22: BYE). The relay server 12 returns an OK response to the client terminal 11.

The information on the dialog(1) is deleted from the information on the channels used by the client terminal 11 and the relay server 12.

In the dialog(2), the relay server 12 requests the relay server 22 to disconnect the session (Step S23: BYE). The relay server 22 returns an OK response to the relay server 12.

The information on the dialog(2) is deleted from the information on the channels used by the relay server 12 and the relay server 22.

The client terminal 11 requests the relay server 12 to disconnect the media session (Step S24: FIN, ACK). The relay server 12 returns an ACK to the client terminal 11, and subsequently requests the client terminal 11 to disconnect the media session (Step S25: FIN, ACK).

The information on the media session associated with the dialog(1) is deleted from the information on the channels used by the client terminal 11 and the relay server 12.

The relay server 12 requests the relay server 22 to disconnect the media session (Step S26: FIN, ACK). The relay server 22 returns an ACK to the relay server 12, and subsequently requests the relay server 12 to disconnect the media session (Step S27: FIN, ACK). The relay server 12 returns an ACK to the relay server 22. Through the above-described procedure, the media session is disconnected.

The information on the media session associated with the dialog(2) is deleted from the information on the channels used by the relay server 12 and the relay server 22.

(10) Data Transmission/Reception Between the Client Terminal 11 and the Client Terminal 21

(10-1) Call Control Before Establishing the Media Session

FIG. 14 is a view showing a flow of the call control before the media session is established in the data transmission/reception between the client terminal 11 and the client terminal 21. The user of the client terminal 11 confirms the relay group to which the client terminal 11 belongs. Specifically, the user of the client terminal 11 causes the relay group information 42 to be displayed on a display screen of the client terminal 11 (getGroup( )). In the relay group information 42, "relay-server-1@abc.net" and "relay-server-2@abc.net", which are identification information of the relay servers 12 and 22, are set. The user of the client terminal 11 confirms that the client terminal 11 belongs to the relay group composed of the relay servers 12 and 22.

The user of the client terminal 11 causes the relay server information 54 that corresponds to the relay group information 42, to be displayed on the display screen of the client terminal 11 (getServer( )). The user of the client terminal 11 refers to the relay server information 54 and confirms the relay servers, that constitute the relay group, and the client terminals located below the relay servers.

The user of the client terminal 11 refers to the relay server information 54, and confirms that transmission/reception of the data with the client terminal 21 is possible.

In a similar way to the preparation for Step S12, the user of the client terminal 11 confirms that the relay servers 12 and 22 are activated.

The user of the client terminal 11 confirms that, with regard to the client terminal 21, the client terminal site information 545-2 of the relay server information 54 is set at "relay-server-2@abc.net". In other words, the user of the client terminal 11 confirms that the client terminal 21 is logged on to the relay server 22.

The user of the client terminal 11 confirms that the data can be transmitted to the client terminal 21 through the relay servers 12 and 22. The user of the client terminal 11 then decides to transmit the data to the client terminal 21.

The client terminal 11 performs the call control for the relay server 12 in the communication (dialog(3)) between the client terminal 11 and the relay server 12 (Step S28: INVITE). Here, the client terminal 11 transmits "4321" to the relay server 12 as identification information of the call control in the dialog(3). Moreover, the client terminal 11 transmits "5678" to the relay server 12 as a port number of the media session.

Also in FIG. 14 to FIG. 16, the information on channels used in the respective terminals and servers is shown. In the channel used by the client terminal 11, "4321" is set as ID of the dialog(3). Since the media session has not been established, the column of MS is blank.

In the dialog(3), the relay server 12 undergoes the call control performed by the client terminal 11. The relay server 12 then transmits an OK response to the client terminal 11. The client terminal 11 that has received the OK response transmits an ACK to the relay server 12 (Step S29).

The dialog(1) and the dialog(3) are executed between the client terminal 11 and the relay server 12. However, the identification information of the call control in the dialog(1) is "1234" and the identification information of the call control in the dialog(3) is "4321", which are different from each other. Therefore, the call control in the dialog(1) and the call control in the dialog(3) can be distinguished from each other.

In communication (dialog(4)) between the relay server 12 and the relay server 22, the relay server 12 performs the call control for the relay server 22 (Step S30: INVITE). Here, the relay server 12 transmits "1234" to the relay server 22 as identification information of the call control in the dialog(4). Moreover, the relay server 12 transmits "5678" to the relay server 22 as the port number of the media session.

In the channel used by the relay server 12, "4321" as ID of the dialog(3) and "1234" as ID of the dialog(4) are set. Since the media session has not been established, either of the columns of MS is blank.

In the dialog(4), the relay server 22 undergoes the call control performed by the relay server 12. The relay server 22 then transmits an OK response to the relay server 12. The relay server 12 that has received the OK response transmits an ACK to the relay server 22 (Step S31).

Between the relay server 12 and the relay server 22, the dialog(2) and the dialog(4) are executed. However, the identification information of the call control in the dialog(2) is "4321" and the identification information of the call control in the dialog(4) is "1234", which are different from each other. Therefore, the call control in the dialog(2) and the call control in the dialog(4) can be distinguished from each other.

The identification information of the call controls in the dialog(1) and the dialog(4) are the same "1234". However, since the call controls in the dialog(1) and the dialog(4) are call controls in different sections, the call controls can be distinguished from each other.

The identification information of the call controls in the dialog(2) and the dialog(3) are the same "4321". However, since the call controls in the dialog(2) and the dialog(3) are call controls in different sections, the call controls are identified with each other.

When having received the data in the dialog(3), the relay server 12 creates the information indicating that the dialog(3) and the dialog(4) are associated with each other, and then transmits the data in the dialog(4). In this transmission/reception, such an association between the dialog(3) and the dialog(4) is represented by "dialog(3): recv( )==dialog(4): send( )".

When having received the data in the dialog(4), the relay server 12 refers to the information indicating that the dialog(3) and the dialog(4) are associated with each other, and then transmits the data in the dialog(3). In this transmission/reception, such an association between the dialog(3) and the dialog(4) is represented by "dialog(3): send( )==dialog(4): recv( )".

In communication (dialog(5)) between the relay server 22 and the client terminal 21, the relay server 22 performs call control for the client terminal 21 (Step S32: INVITE). Here, the relay server 22 transmits "8765" to the client terminal 21 as identification information of the call control in the dialog (5). Moreover, the relay server 22 transmits "5678" to the client terminal 21 as the port number of the media session.

In the channel used by the relay server 22, "1234" as ID of the dialog(4) and "8765" as ID of the dialog(5) are set. Since the media session has not been established, either of the columns of MS is blank.

The client terminal 21 undergoes the call control performed by the relay server 22 in the dialog(5). The client terminal 21 then transmits an OK response to the relay server 22. The relay server 22 that has received the OK response transmits an ACK to the client terminal 21 (Step S33).

In the channel used by the client terminal 21, "8765" as ID of the dialog(5) is set. Since the media session has not been established, the column of MS is blank.

(10-2) Media Session Establishment

FIG. 15 is a view showing a flow of the media session establishment in the data transmission/reception between the client terminal 11 and the client terminal 21.

The client terminal 21 requests the relay server 22 to establish the media session (Step S34: SYN). The relay server 22 returns a SYN and an ACK to the client terminal 21. The client terminal 21 transmits an ACK to the relay server 22 (Step S35).

Next, the client terminal 21 transmits "8765" as the identification information of the call control to the relay server 22 through the media session (Step S36: send). The relay server 22 collates the identification information of the call control received in Step S36 with the identification information of the call control transmitted in Step S32.

The relay server 22 authenticates that the client terminal that has performed the media session establishment request in Step S34 matches the client terminal 21 that has undergone the call control in Step S32. In other words, the relay server 22 has not received an illegitimate media session establishment request from the client terminal 21 in Step S34. The relay server 22 then transmits an OK response to the client terminal 21.

In the information on the channel used by the client terminal 21, ClientSocket(3) is set as the media session associated with the dialog(5). In the information on the channel used by the relay server 22, ServerSocket(3) is set as the media session associated with the dialog(5).

Subsequently, the relay server 22 requests the relay server 12 to establish the media session (Step S37: SYN). The relay server 12 returns a SYN and an ACK to the relay server 22. The relay server 22 transmits an ACK to the relay server 12 (Step S38).

Next, the relay server 22 transmits "1234" as the identification information of the call control to the relay server 12 through the media session (Step S39: send). The relay server 12 collates the identification information of the call control received in Step S39 with the identification information of the call control transmitted in Step S30.

The relay server 12 authenticates that the relay server that has performed the media session establishment request in Step S37 matches the relay server 22 that has undergone the call control in Step S30. In other words, the relay server 12 has not received an illegitimate media session establishment request from the relay server 22 in Step S37. The relay server 12 transmits an OK response to the relay server 22.

In the information on the channel used by the relay server 22, ClientSocket(4) is further set as the media session associated with the dialog(4). In the information on the channel used by the relay server 12, ServerSocket(4) is set as the media session associated with the dialog(4).

Subsequently, the relay server 12 requests the client terminal 11 to establish the media session (Step S40: SYN). The client terminal 11 returns a SYN and an ACK to the relay server 12. The relay server 12 transmits an ACK to the client terminal 11 (Step S41).

Next, the relay server 12 transmits "4321" as the identification information of the call control to the client terminal 11 through the media session (Step S42: send). The client terminal 11 collates the identification information of the call control received in Step S42 with the identification information of the call control transmitted in Step S28.

The client terminal 11 authenticates that the relay server that has performed the media session establishment request in Step S40 matches the relay server 12 that has undergone the call control in Step S28. In other words, the client terminal 11 has not received an illegitimate media session establishment request from the relay server 12 in Step S40. The client terminal 11 then transmits an OK response to the relay server 12.

In the information on the channel used by the relay server 12, ClientSocket(5) is further set as the media session associated with the dialog(3). In the information on the channel used by the client terminal 11, ServerSocket(5) is set as the media session associated with the dialog(3).

Through the above-described process, the media sessions are established between the client terminal 21 and the relay server 22, between the relay server 22 and the relay server 12, and between the relay server 12 and the client terminal 11.

(10-3) Media Session Disconnection

FIG. 16 is a view showing a flow of media session disconnection in the data transmission/reception between the client terminal 11 and the client terminal 21.

In the dialog(3), the client terminal 11 requests the relay server 12 to disconnect the session (Step S43: BYE). The relay server 12 returns an OK response to the client terminal 11.

The information on the dialog(3) is deleted from the information on the channels used by the client terminal 11 and the relay server 12.

In the dialog(4), the relay server 12 requests the relay server 22 to disconnect the session (Step S44: BYE). The relay server 22 returns an OK response to the relay server 12.

The information on the dialog(4) is deleted from the information on the channels used by the relay server 12 and the relay server 22.

In the dialog(5), the relay server 22 requests the client terminal 21 to disconnect the session (Step S45: BYE). The client terminal 21 returns an OK response to the relay server 22.

The information on the dialog(5) is deleted from the information on the channels used by the relay server 22 and the client terminal 21.

The client terminal 11 requests the relay server 12 to disconnect the media session (Step S46: FIN, ACK). The relay server 12 returns an ACK to the client terminal 11, and subsequently requests the client terminal 11 to disconnect the media session (Step S47: FIN, ACK). The client terminal 11 returns an ACK to the relay server 12. Through the above-described procedure, the media session is disconnected.

The information on the media session associated with the dialog (3) is deleted from the information on the channels used by the client terminal 11 and the relay server 12.

In a similar way, the media session is disconnected between the relay server 12 and the relay server 22 (Steps S48, S49).

The information on the media session associated with the dialog(4) is deleted from the information on the channels used by the relay server 12 and the relay server 22.

Moreover, the media session is also disconnected between the relay server 22 and the client terminal 21 (Steps S50, S51).

The information on the media session associated with the dialog(5) is deleted from the information on the channels used by the relay server 22 and the client terminal 21.

(11) Data Transmission/Reception Executed in Parallel

The data transmission/reception between the client terminal 11 and the relay server 22 and the data transmission/reception between the client terminal 11 and the client terminal 21 are executed in parallel to each other. When attention is paid only to Steps S12 to S27, the process is executed in such an order. When attention is paid only to Steps S28 to S51, the process is executed in such an order.

The dialog(1) and the dialog(3) are executed between the client terminal 11 and the relay server 12. However, the identification information of the call control in the dialog(1) is "1234" and the identification information of the call control in the dialog(3) is "4321", which are different from each other.

The client terminal 11 receives the media session establishment request in Step S19, and in addition, receives the identification information of the call control in Step S21. Accordingly, the client terminal 11 can authenticate that the media session establishment request in Step S19 corresponds to the call control execution in Step S12, and does not correspond to the call control execution in Step S28.

The client terminal 11 receives the media session establishment request in Step S40, and in addition, receives the identification information of the call control in Step S42. Accordingly, the client terminal 11 can authenticate that the media session establishment request in Step S40 corresponds to the call control execution in Step S28, and does not correspond to the call control execution in Step S12.

Between the relay server 12 and the relay server 22, the dialog(2) and the dialog(4) are executed. However, the identification information of the call control in the dialog(2) is "4321" and the identification information of the call control in the dialog(4) is "1234", which are different from each other.

The relay server 12 receives the media session establishment request in Step S16, and in addition, receives the identification information of the call control in Step S18. Accordingly, the relay server 12 can authenticate that the media session establishment request in Step S16 corresponds to the call control execution in Step S14, and does not correspond to the call control execution in Step S30.

The relay server 12 receives the media session establishment request in Step S37, and in addition, receives the identification information of the call control in Step S39. Accordingly, the relay server 12 can authenticate that the media session establishment request in Step S37 corresponds to the call control execution in Step S30, and does not correspond to the call control execution in Step S14.

When the above-described process flow is applied, the client terminal 11 and the relay servers 12 and 22 can be prevented from receiving illegitimate media session establishment requests.

Even when having received the media session establishment request in a similar way to Steps S19 and S40, in the case of not receiving the legitimate identification information of the call control in a similar way to Steps S21 and S42, the client terminal 11 needs not transmit the OK response.

Even when having received the media session establishment request in a similar way to Steps S16 and S37, in the case of not receiving the legitimate identification information of the call control in a similar way to Steps S18 and S39, the relay server 12 needs not transmit the OK response.

Even when having received the media session establishment request in a similar way to Step S34, in the case of not receiving the legitimate identification information of the call control in a similar way to Step S36, the relay server 22 needs not transmit the OK response.

In the event of performing a plurality of call controls, the side that performs the call controls allows the respective call controls and the respective media sessions to correspond to each other based on the identification information of the call controls, thereby prevents the crossover between the plurality of call controls and prevents the crossover between the plurality of media sessions. In the event of performing the call controls, the side that performs the call controls can prevent the illegitimate media session establishment requests.

Figure 17:
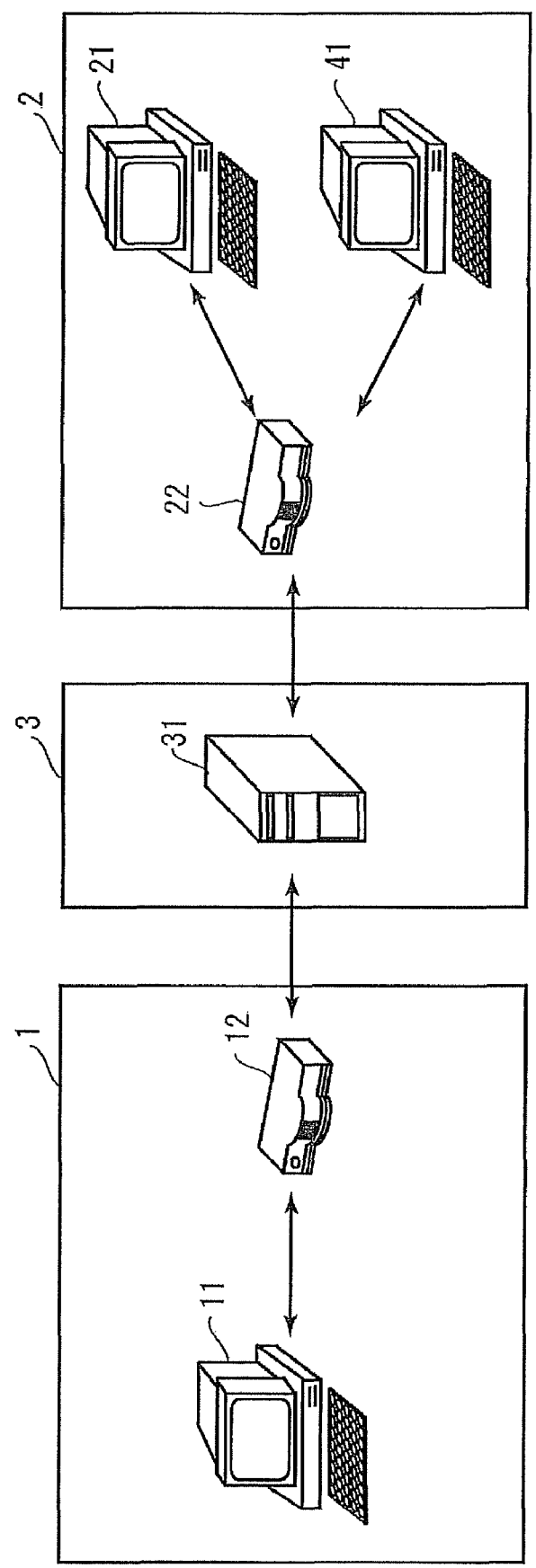
FIG. 17 is a view showing an overall configuration of a relay communication system in a Second Preferred Embodiment of the present invention.

Second Preferred Embodiment (1) Overall Configuration of Relay Communication System A description will be made below of a second preferred embodiment of the present invention with reference to the drawings. FIG. 17 is a view showing an overall configuration of a relay communication system. The relay communication system preferably includes LANs 1 and 2 and a WAN 3. The LANs 1 and 2 are small-scale networks constructed remotely from each other. The WAN 3 is a large-scale network such as the Internet.

The LAN 1 preferably includes a client terminal 11 and a relay server 12. The LAN 2 preferably includes client terminals 21 and 41 and a relay server 22. The WAN 3 preferably includes a SIP (Session Initiation Protocol) server 31.

The client terminals 11, 21 and 41 preferably are personal computers and the like, for example. The relay servers 12 and 22 relay communication between the client terminal 11 and the client terminals 21 and 41. The SIP server 31 relays communication between the relay servers 12 and 22.

In the present preferred embodiment, the SIP is preferably used as a communication protocol between the relay servers 12 and 22; however, protocols other than the SIP may be used. In the case of using protocols other than the SIP, the communication between the relay servers 12 and 22 may be directly executed.

(2) Constituent Elements of Relay Server

Figure 18:
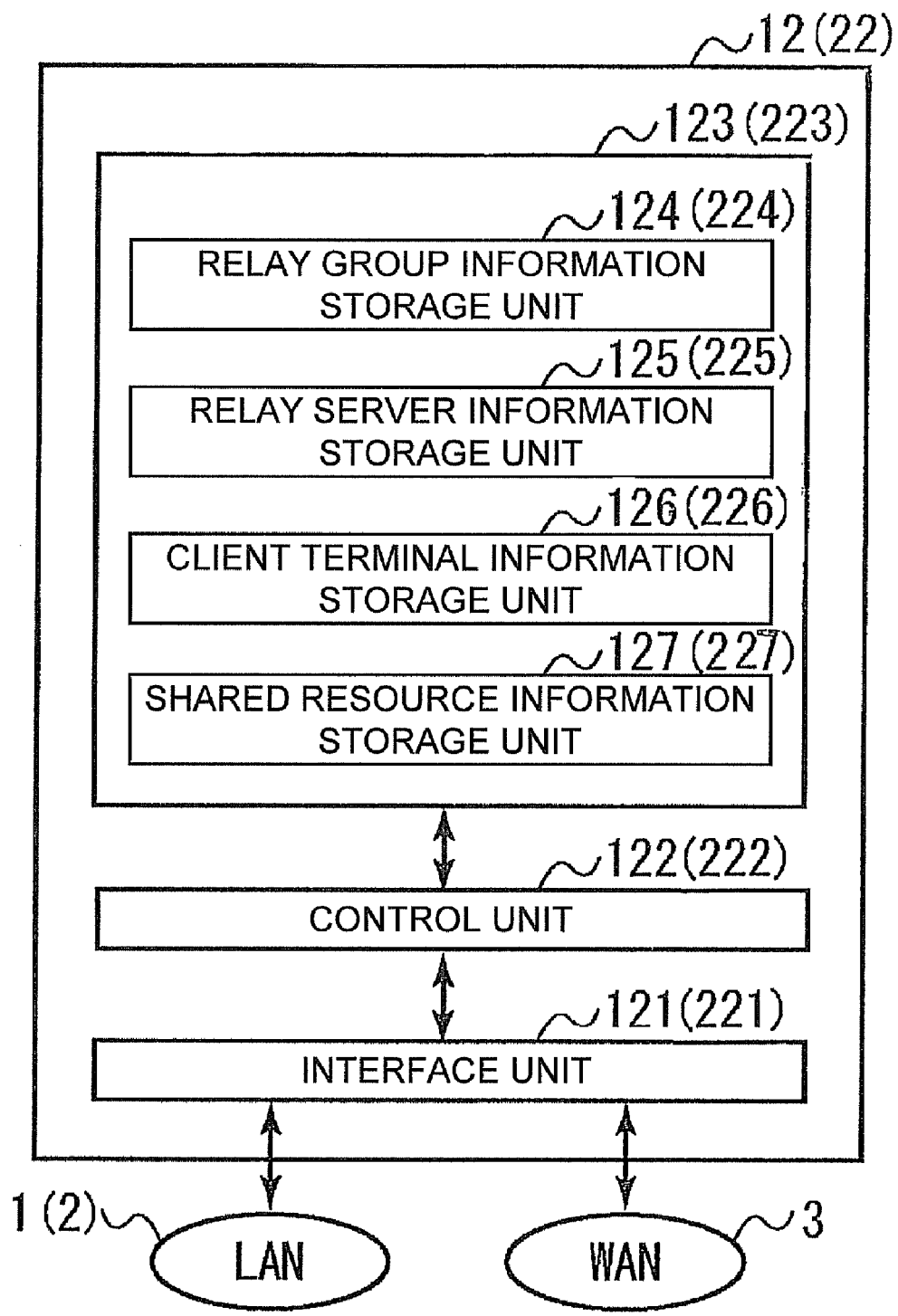
FIG. 18 is a view showing constituent elements of a relay server in the Second Preferred Embodiment of the present invention.

FIG. 18 is a view showing constituent elements of the relay server 12(22). The relay server 12(22) preferably includes an interface unit 121(221), a control unit 122(222) and a database storage unit 123(223). Reference numerals which are not parenthesized are reference numerals for the relay server 12. Reference numerals which are parenthesized are reference numerals for the relay server 22.

The interface unit 121(221) performs communication with the client terminal 11(21, 41) connected to the LAN 1(2) through a private IP address. The interface unit 121(221) performs communication with the SIP server 31 connected to the WAN 3 through a global IP address.

The control unit 122(222) executes control for relaying the communication between the client terminal 11 and the client terminals 21 and 41. The control unit 122(222) creates or updates the information (to be described below) stored in the database storage unit 123(223).

The database storage unit 123(223) preferably includes a relay group information storage unit 124(224), a relay server information storage unit 125(225), a client terminal information storage unit 126(226), and a shared resource information storage unit 127(227). A description will be made later of specific examples of the above-mentioned information.

(3) Constituent Elements of Client Terminal

Figure 19:
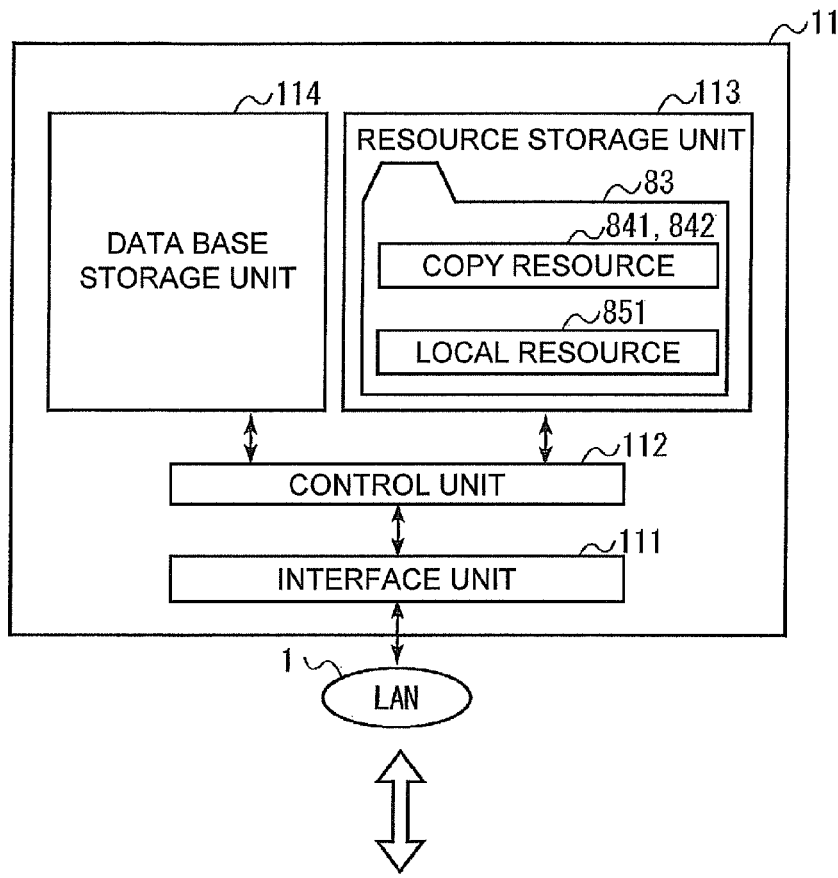
FIG. 19 is a view showing constituent elements of a client terminal in the Second Preferred Embodiment of the present invention.

FIG. 19 is a view showing constituent elements of the client terminal 11, and resources stored by the client terminals 11 and 21. In FIG. 19, the LAN 2, the WAN 3 and the relay servers 12 and 22, as well as a detailed configuration of the client terminal 21 are omitted.

The client terminal 11 preferably includes an interface unit 111, a control unit 112, a resource storage unit 113, and a database storage unit 114.

The interface unit 111 performs communication with the relay server 12 connected to the LAN 1 through an IP address.

The control unit 112 controls the communication, which is performed with the relay servers and the client terminals through the interface unit 111. Various information stored in the database storage unit 114 are managed by the control unit 112.

The resource storage unit 113 stores resources such as files and folders. In a download folder 83 created in the resource storage unit 113, entities of copy resources 841 and 842 and of a local resource 851, which can be used only by the client terminal 11, are stored.

The copy resources 841 and 842 are copies of shared resources 861 and 862 stored by the client terminal 21. The shared resources 861 and 862 are shared between the client terminals 11 and 21. The local resource 851 is a resource that has no relationship with the shared resources 861 and 862.

Note that, as a general group, the copy resources 841 and 842 are referred to as a copy resource 84. As a general group, the shared resources 861 and 862 are referred to as a shared resource 86.

The database storage unit 114 stores relay group information 40, relay server information 50, shared resource management information 81, and copy resource management information 82.

The client terminals 21 and 41 have similar configuration to that of the client terminal 11. Therefore, a detailed description of the configuration of the client terminals 21 and 41 is omitted. However, in a resource storage unit 213 of the client terminal 21, a shared folder 863 is created as the shared resource. In the shared folder 863, entities of the shared resources 861 and 862 are stored. In the resource storage unit 213, a local resource 852 is also stored.

(4) Specific Example of Relay Group Information

Figure 20:
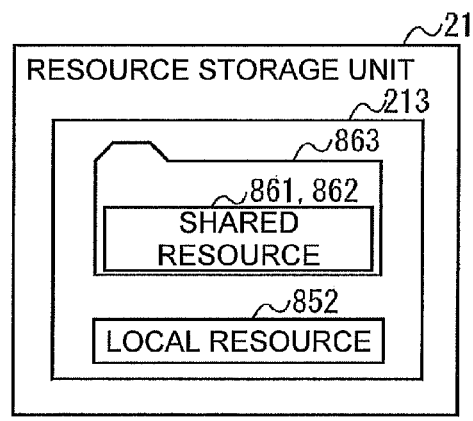
FIG. 20 is a view showing a specific example of relay group information in the Second Preferred Embodiment of the present invention.

FIG. 20 is a view showing a relay group information 40 as a specific example of the relay group information. The relay group information is an information indicating outlines of the relay servers that constitute the relay communication system.

The relay group information 40 preferably includes upper information 401 and lower information 402.

The upper information 401 is information regarding the relay group, which is the upper level. "id" indicates identification information of the relay group. "lastmod" indicates the latest update time of the relay group information. "name" indicates the name of the relay group.

The lower information 402 is information regarding the relay server, which is the lower level. "id" indicates identification information of the relay server.

The relay group information 40 is stored in the relay group information storage unit 124 and 224. Specifically, the relay group information 40 is shared between the relay servers 12 and 22. Moreover, the relay group information 40 may be shared between the relay servers and the client terminals.

(5) Specific Example of Relay Server Information

FIG. 21 is a view showing a relay server information 50 as a specific example of the relay server information. The relay server information is an information indicating details of the relay servers that constitute the relay communication system, and is an information indicating outlines of the client terminals that constitute the relay communication system.

The relay server information 50 preferably includes upper information 501-1 and 501-2 and lower information 502-1 and 502-2. The upper information 501-1 and 501-2 include relay server activation information 503-1 and 503-2, respectively. The lower information 502-1 and 502-2 include client terminal site information 504-1 and 504-2, respectively.

The upper information 501-1 and 501-2 are information regarding the relay servers, which are the upper level. "id" indicates identification information of the relay servers. "name" indicates the names of the relay servers. The relay server activation information 503-1 and 503-2 are information as to whether the relay servers are activated.

The lower information 502-1 and 502-2 are information regarding the client terminals, which are the lower level. "div" indicates the name of a division to which the client terminals belong. "group" indicates identification information of the relay group to which the client terminals belong. "id" indicates identification information of the client terminals. "name" indicates the names of the client terminals. The client terminal site information 504-1 and 504-2 indicate the identification information of the relay servers to which the client terminals have logged in.

The relay server information 50 is stored in the relay server information storage units 125 and 225. Specifically, the relay server information 50 is shared between the relay servers 12 and 22. Moreover, the relay server information 50 maybe shared between the relay servers and the client terminals.

When the relay servers are activated, the relay server activation information 503-1 and 503-2 become "active". When the relay servers are not activated, the relay server activation information 503-1 and 503-2 are blank. In such away, the information as to whether or not the relay servers are activated is shared in the whole relay communication system.

When the client terminals are logged on to the relay servers, it is described in the client terminal site information 504-1 and 504-2. When the client terminals are not logged on to the relay servers, nothing is described in the client terminal site information 504-1 and 504-2. In such a way, the information as to whether or not the client terminals are logged on to the relay servers is shared in the whole relay communication system.

(6) Specific Example of Client Terminal Information

FIG. 22 is a view showing client terminal information 60 and 70 as specific examples of the client terminal information. The client terminal information is an information indicating details of the client terminals that constitute the relay communication system.

The client terminal information 60 and 70, respectively, include client terminal address information 601 and 701, client terminal expiration period information 602 and 702, and client terminal port information 603 and 703.

"div" indicates the name of a division to which the client terminals belong. "group" indicates identification information of the relay group to which the client terminals belong. Client terminal address information 601 and 701 indicate IP addresses of the client terminals. The client terminal expiration period information 602 and 702 indicate registration expiration periods of the client terminals. "id" indicates identification information of the client terminals. "name" indicates the names of the client terminals. "pass" indicates passwords of the client terminals. The client terminal port information 603 and 703 indicate port numbers of the client terminals.

The client terminal information 60 is stored only in the client terminal information storage unit 126, and the client terminal information 70 is stored only in the client terminal information storage unit 226. In other words, the client terminal information 60 is owned only by the relay server 12, and the client terminal information 70 is owned only by the relay server 22.

(7) Specific Example of the Shared Resource Management Information

FIG. 23 is a view showing a shared resource management information 81 as a specific example of the shared resource management information. The shared resource management information 81 is an information indicating details of the shared resource 86 and is created for each group of the client terminals that share the shared resource 86.

The shared resource management information 81 preferably includes body information 811, sharing terminal information 812, and shared resource individual information 813-1 to 813-5. As a general group, the shared resource individual information 813-1 to 813-5 are referred to as shared resource individual information 813.

The body information 811 is an information regarding the body of the shared resource management information 81. "id" is an identification number of the shared resource management information 81. "owner" indicates the client terminal that has created the shared resource management information 81.

The sharing terminal information 812 is an information regarding the client terminals that constitute the group sharing the shared resource 86. In the sharing terminal information 812, identification information of the client terminals, which is described in the client terminal information 60 and 70 and the like, is described.

The shared resource individual information 813 is created for each shared resource 86, and attribute information of the shared resource 86 is described therein. The shared resource individual information 813-1 corresponds to the shared folder 863. The shared resource individual information 813-2 and 813-4 correspond to the shared resources 861 and 862, respectively.

The attribute information of the shared resource individual information 813 are indicated in the resource tags, in which "id" is identification information (shared resource ID) of the shared resource individual information 813. "lastmod" indicates the latest update time of the shared resource 86. "len" indicates the size of the shared resource 86. "name" indicates the name of the shared resource 86. "owner" indicates a client terminal (owner client terminal) capable of accessing the entity of the shared resource 86. "stat" is an information indicating as to whether or not the shared resource 86 is accessible. "type" indicates whether the shared resource 86 is a file or a folder. "value" indicates, with the full path, a storage place of the entity of the shared resource 86.

The shared resource individual information 813 is described in a tree structure. From "type="dir"", it is understood that the shared resource individual information 813-1 corresponds to the shared folder 863. The shared resource individual information 813-2 to 813-5 are established within the resource tag of the shared resource individual information 813-1. From these facts, it is understood that the shared resource 86 corresponding to the shared resource individual information 813-2 to 813-5 is virtually stored in the shared folder 863 corresponding to the shared resource individual information 813-1.

Hence, the tree structure of the shared resource individual information 813 does not have to reflect the storage place of the entity of the shared resource 86. For example, the shared resource 86 corresponding to the shared resource individual information 813-2 to 813-5 does not have to be stored in the shared folder 863. The respective shared resources 86 corresponding to the shared resource individual information 813-1 to 813-5 may be stored not in one client terminal but in a plurality of the client terminals dispersedly.

The shared resource management information 81 is shared between the client terminals 11 and 21, as set by the sharing terminal information 812. Moreover, the shared resource management information 81 is shared between the relay servers 12 and 22.

(8) Specific Example of the Copy Resource Management Information

Figures 24, 25:
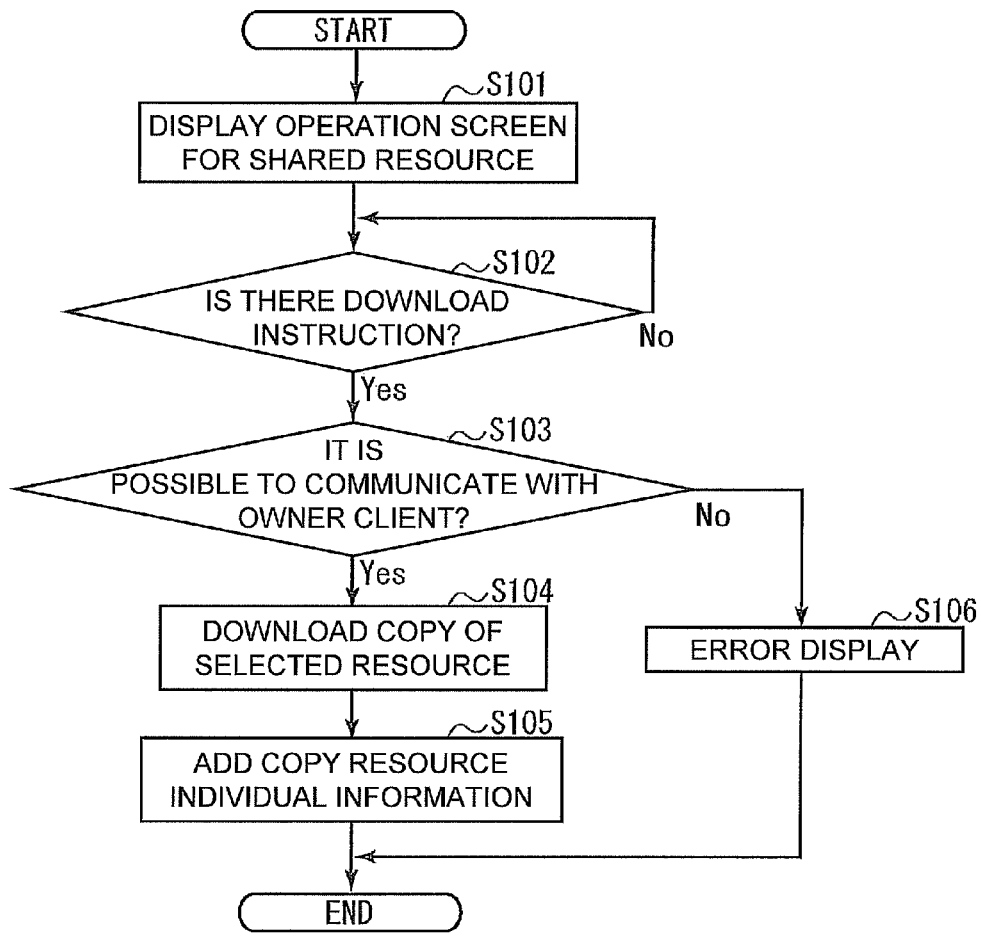
FIG. 24 is a view showing a specific example of the copy resource management information in the Second Preferred Embodiment of the present invention.
FIG. 25 is a flowchart of a client terminal that downloads a shared resource in the Second Preferred Embodiment of the present invention.

FIG. 24 is a view showing a copy resource management information 82 as a specific example of the copy resource management information. The copy resource management information 82 is a list information of the copy resources 84 stored by the respective client terminals.

The copy resource management information 82 preferably includes download folder information 821 and copy resource individual information 822-1 and 822-2. As a general group, the copy resource individual information 822-1 and 822-2 are referred to as copy resource individual information 822.

The download folder information 821 is an information regarding the download folder 83. In the workspace tag, in "id", an identification number of the shared resource management information 81 is indicated. "path" indicates the full path of the download folder 83. Through "id" of the workspace tag, the shared resource management information 81 and the copy resource management information 82 are allowed to correspond to each other.

The copy resource individual information 822 is an information that allows the copy resource 84 and the shared resource individual information 813 to correspond to each other, and is created for each copy resource 84. The copy resource individual information 822-1 corresponds to the copy resource 841.

In the resource tag corresponding to the copy resource individual information 822, in "id", a shared resource ID of the shared resource individual information 813 is indicated. Through "id" of the resource tag, the copy resource 84 and the shared resource management information 813 corresponding to the shared resource 86 from which it was copied are allowed to correspond to each other. "path" indicates the full path of the copy resource 84.

Each of the client terminals individually holds the copy resource management information 82, and contents thereof are different among the client terminals. This is because the shared resources to be downloaded differ depending on the client terminals.

(9) Flow of Construction of the Relay Communication System

A description is made of a flow where the relay communication system shown in FIG. 17 is constructed. The relay server 12(22) acquires the global IP address and account of the relay server 22(12) from the SIP server 31. The relay server 12 requests the relay server 22 to construct the group, whereby the server 12(22) creates the relay group information 40 through the global IP address and the account acquired from the SIP server 31. In such a way, the relay group is constructed.

The relay server 12(22) transmits the upper information 501-1 (501-2) and the lower information 502-1 (502-2) to the relay server 22(12). The relay server 12(22) creates the relay server information 50 from the upper information 501-1 and 501-2 and the lower information 502-1 and 502-2.

In the case where the client terminal 11 has logged on to the relay server 12, the relay server 12 adds the client terminal site information 504-1 to the relay server information 50. An update notice of the relay server information 50 is transmitted to the relay server 22, and the updated relay server information 50 is transmitted to the client terminal 11. Based on the update notice, the relay server 22 updates the relay server information 50.

In the case where the client terminal 21 has logged on to the relay server 22, the relay server 22 adds the client terminal site information 504-2 to the relay server information 50. An update notice of the relay server information 50 is transmitted to the relay server 12, and the updated relay server information 50 is transmitted to the client terminal 21. The relay server 12 transfers the update notice of the relay server information 50 to the client terminal 11. Based on the update notice, the client terminal 11 and the relay server 12 update the relay server information 50.

In such a way, the communication between the client terminals 11 and 21 becomes possible, and the relay communication system is constructed. Moreover, the relay group information 40 is updated in response to the change of the configuration of the relay group. In the case where the configuration of the relay communication system is changed due to the logon and the logoff of the client terminals and the like, the relay server information 50 is updated. An update notice of the relay server information 50 is transmitted by the relay servers 12 and 22, or is transferred to the client terminals. The client terminals and the relay servers, which have received the update notice, update the relay server information 50 based on the update notice. In such a way, the apparatuses that constitute the relay communication system can confirm the changes in number and the connection state of the apparatuses in real time through the relay group information 40 and the relay server information 50.

(10) Flow of Sharing the Resource

A description is made of a flow of sharing the resource in the relay communication system shown in FIG. 17. As an initial state, the client terminals 11 and 21 and the relay servers 12 and 22 constitute the relay communication system.

First, the user of the client terminal 21 designates the client terminals 11 and 21 as the client terminals that share the resource. The client terminal 21 creates the shared resource management information 81. As the sharing terminal information 812, the identification information of the client terminals 11 and 21, which are set by the relay server information 50, the client terminal information 60 and the like, are set. As the creation source ("owner" in the body information 811) of the shared resource management information 81, the client terminal 21 is set.

The shared resource management information 81 is transmitted to the client terminal 11 via the relay servers 22 and 12. When relaying the shared resource management information 81, the relay servers 12 and 22 store the shared resource management information 81 in the shared resource information storage units 127 and 227, respectively. The client terminal 11 stores the received shared resource management information 81 in the database storage unit 114.

Next, having been instructed to share the local resource 852, the client terminal 21 creates the shared resource individual information 813 corresponding to the local resource 852, and adds the shared resource individual information 813 to the shared resource management information 81. A change notice indicating the addition of the shared resource individual information 813 is transmitted to the client terminal 11 via the relay servers 22 and 12. Based on the received change notice, the client terminal 11 adds the shared resource individual information 813 to the shared resource management information 81. In such a way, the local resource 852 is shared between the client terminals 11 and 21.

A description is made of releasing the sharing of the shared resource 861 while the shared resource 861 is shared between the client terminals 11 and 21. In the case where the user of the client terminal 21 has instructed the release of the sharing of the shared resource 861, the client terminal 21 deletes the shared resource individual information 813-2 from the shared resource management information 81. The shared resource ID 814-2 of the shared resource individual information 813-2 is transmitted as the change notice, which indicates the deletion of the shared resource 861, to the client terminal 11 via the relay servers 22 and 12. Based on the received change notice, the client terminal 11 deletes the shared resource individual information 813-2 from the shared resource management information 81. In such a way, the sharing of the shared resource 861 is released. Moreover, also in the case where the entity of the shared resource 861 is deleted, the sharing of the shared resource 861 is released in a similar way.

Note that, when relaying the transmission of the change notice, in response to the change notice, the relay servers 12 and 22 update the shared resource management information 81 stored respectively in the shared resource information storage units 127 and 237.

Note that, before transmitting the shared resource management information 81 and the change notice, the client terminal 21 has referred to the relay group information 40 and the relay server information 50, and has confirmed that the communication with the client terminal 11 can be made. In such a way, the shared resource management information 81 and the change notice can be transmitted to the client terminal 11 for certain, and accordingly, the client terminals 11 and 21 can assuredly share the shared resource 86.

Moreover, in a similar way to the client terminal 21, the client terminal 11 is capable of adding and deleting the shared resource individual information 813. In the case of having changed the shared resource management information 81, the client terminal 11 transmits a notice of the change to the client terminal 21.

(11) Downloading of the Shared Resource

Next, a description is made of operations of the client terminal 11 when downloading the shared resource 86. For example, in such a case where the user of the client terminal 11 edits the shared resource 862, the downloading of the shared resource 862 is performed.

FIG. 25 is a flowchart of the client terminal 11 that downloads the shared resource 86. As an initial state, the client terminals 11 and 21 and the relay servers 12 and 22 store the shared resource management information 81 shown in FIG. 23, and the client terminal 11 stores the copy resource management information 82 shown in FIG. 24.

First, in response to an operation of the user, the client terminal 11 displays an operation screen 87 for the shared resource on a monitor thereof (Step S101).

Figure 26:
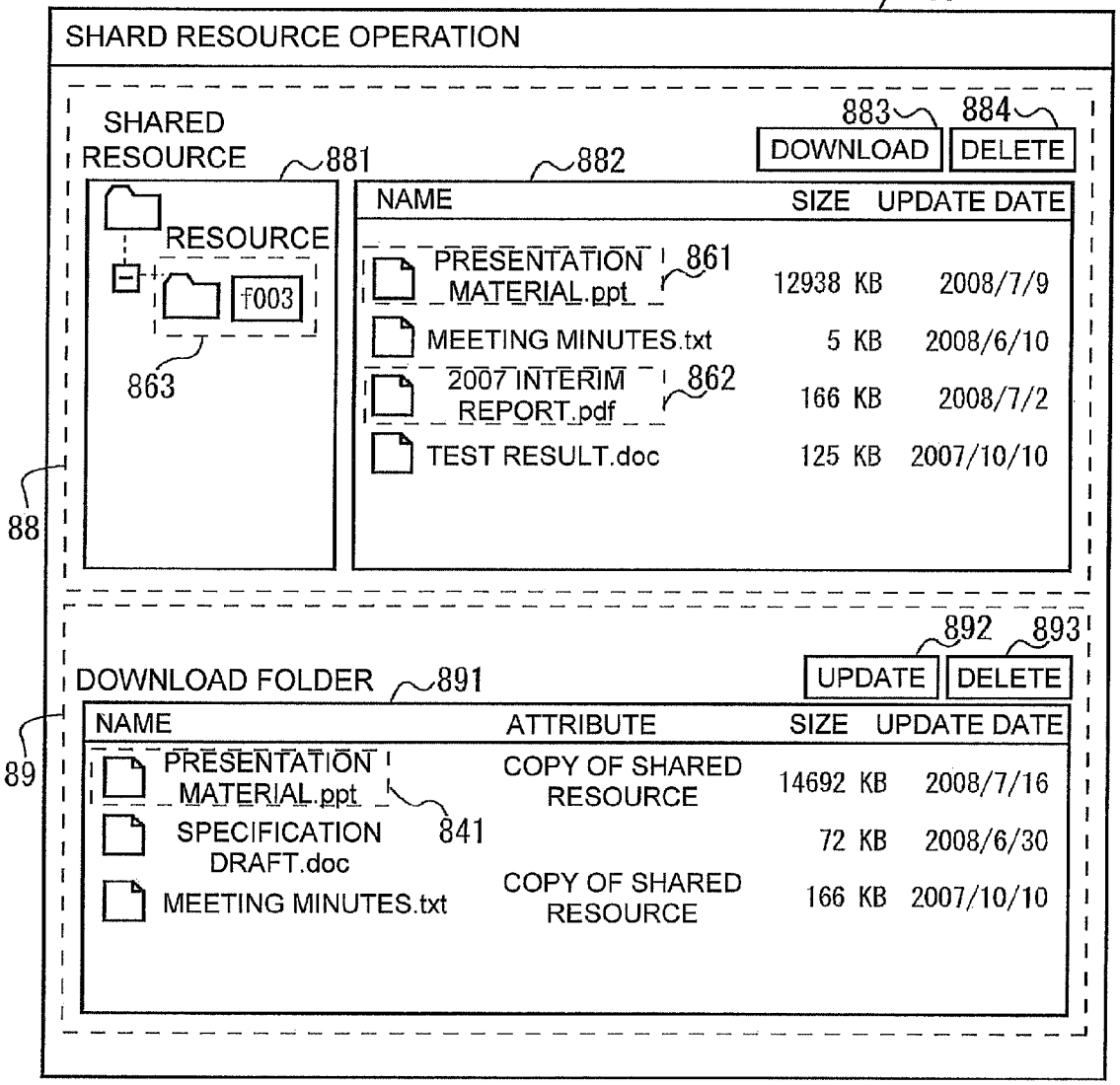
FIG. 26 is a view showing an operation screen for a shared resource in an initial state in the Second Preferred Embodiment of the present invention.

FIG. 26 is a view showing an initial state of the operation screen 87 for the shared resource. The operation screen 87 is displayed based on the shared resource management information 81 and the copy resource management information 82. The operation screen 87 preferably includes a shared resource display unit 88 and a copy resource display unit 89.

The shared resource display unit 88 includes a shared folder display portion 881, a shared file display portion 882, a download button 883, and a deletion button 884. The shared folder display portion 881 displays a shared folder described in the shared resource individual information 813. The shared file display portion 882 displays a list of shared files virtually stored in the selected shared folder. The download button 883 is an instruction button for the downloading of the shared resource 86. The deletion button 884 is an instruction button for he deletion of the shared resource 86.

On the shared folder display portion 881, a shared folder "f003" (shared folder 863) is selected. On the shared file display portion 882, "presentation material.ppt" (shared resource 861), "meeting minutes.text", "2007 interim report.pdf" (shared resource 862), and "test result.doc" are displayed. The files displayed on the shared file display portion 882 are virtually stored in the shared folder "f003", and respectively correspond to the shared resource individual information 813-2 to 813-5.

The copy resource display unit 89 includes a download folder display portion 891, an update button 892, and a deletion button 893. The download folder display portion 891 displays the resources in the download folder 83 along with attribute information indicating as to whether the resources are copy resources 84. The update button 892 is an instruction button for the update of the shared resource 86 based on the copy resource 84. The deletion button 893 is an instruction button for the deletion of the resources in the download folder 83.

With regard to "presentation material.ppt" (copy resource 841) and "meeting minutes.text" displayed on the copy resource display unit 89, on attribute columns thereof, "copy of shared resource" is displayed. Specifically, "presentation material.ppt" and "meeting minutes.text" are the copy resources 84 corresponding to the copy resource management information 822-1 and 822-2. Moreover, "specification draft.doc" is a local resource, and an attribute column thereof is blank.

In the following, the description returns to FIG. 25. The user of the client terminal 11 selects "2007 interim report.pdf" (shared resource 862) on the shared file display portion 882. At this time, if the user of the client terminal 11 cannot communicate with an owner client terminal of the shared resource 86, the user cannot select the shared resource 86. Such a state where it is impossible for the client terminal 11 to communicate with the owner client terminal is, for example, a state where a relay server to which the owner client terminal is connected is not activated, a state where the owner client terminal is not logged on to the relay server, or the like. Moreover, the user of the client terminal 11 cannot select the shared resource 86 that denies an access thereto. The shared resource that denies the access is set as "stat="NG"" in the shared resource individual information 813. The shared resource 86 that cannot be selected by the user of the client terminal 11 is displayed in a gray out state on the shared file display portion 882.

The download button 883 is clicked (Yes in Step S102), whereby the client terminal 11 confirms whether or not it is possible to communicate with the owner client terminal of the shared resource 862 (Step S103). Specifically, from "owner="client2@relay-server-2.abc.net"" of the shared resource individual information 813-4, it is specified that the owner client terminal of the shared resource 862 is the client terminal 21. The client terminal 11 refers to the relay server information activation information 503-2 and client terminal site information 504-2 of the relay server information 50, and confirms whether or not it is possible to communicate with the client terminal 21.

When it is impossible to communicate with the client terminal 21 (No in Step S103), the client terminal 11 displays an error message indicating that the downloading of the shared resource 862 cannot be performed (Step S106), and ends the process shown in FIG. 25.

On the other hand, when it is possible to communicate with the client terminal 21 (Yes in Step S103), the client terminal 11 downloads the copy of the shared resource 862 as a copy resource 842 (Step S104). The copy resource 842 is stored in the download folder 83. The client terminal 11 adds copy resource individual information 822-3, which corresponds to the copy resource 842, to the copy resource management information 82 (Step S105).

FIG. 27 is a view showing the copy resource management information 82 after added with the copy resource individual information 822-3. In the copy resource individual information 822-3, a shared resource ID 814-4 described in the shared resource individual information 813-4 and a storage place of the copy resource 842, by the full path, are described.

Figure 28:
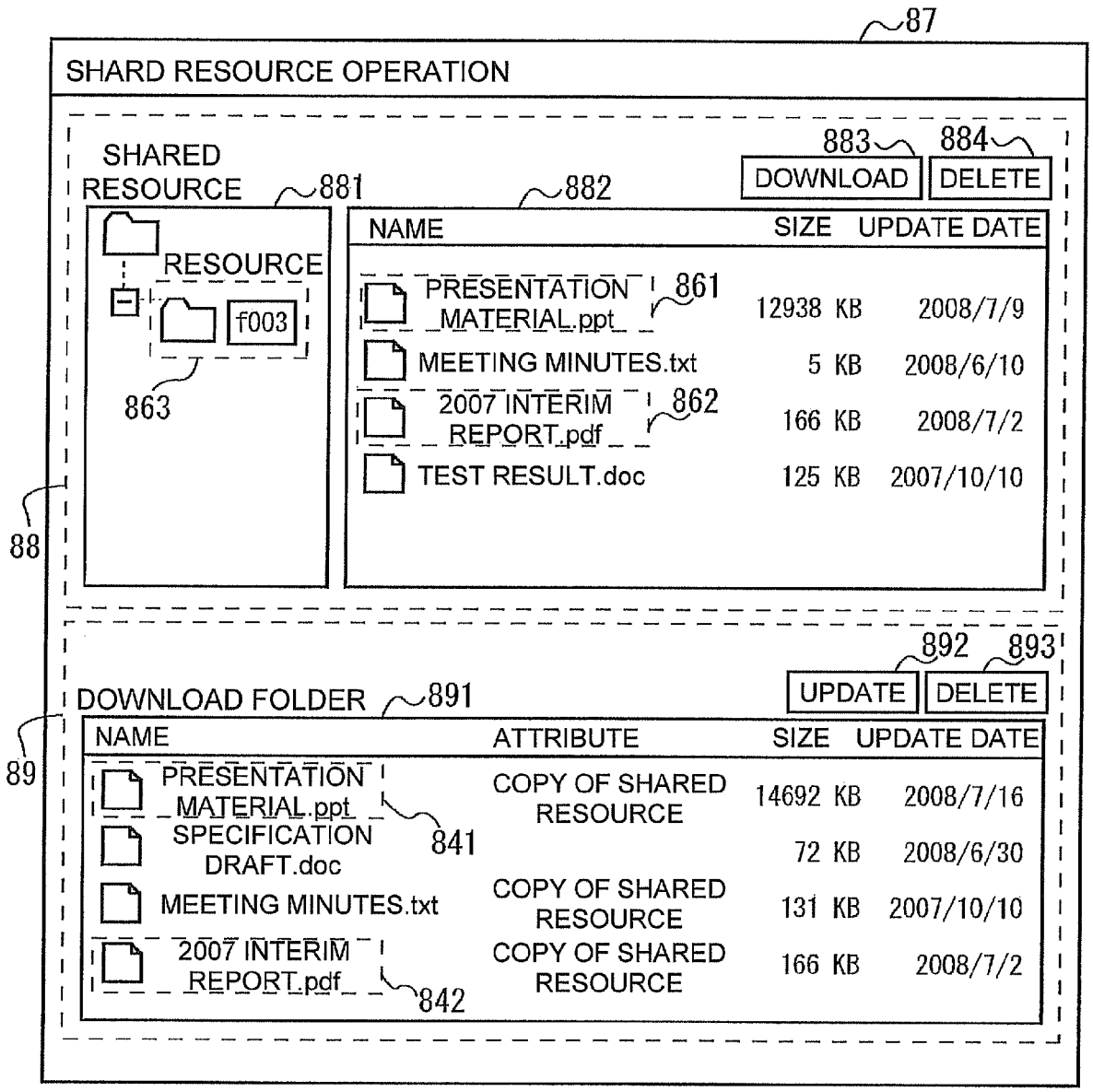
FIG. 28 is a view showing an operation screen for the shared resource after the shared resource is downloaded in the Second Preferred Embodiment of the present invention.

FIG. 28 is a view showing the operation screen 87 after the downloading of the shared resource 862. Through the process shown in Step S104, "2007 interim report.pdf" (copy resource 842) is added to the download folder display portion 891. Moreover, an attribute of the copy resource 842 is displayed as "copy of shared resource" based on the copy resource individual information 822-3.

As described above, with the copy resource individual information 822, the copy resource 84 is stored in the download folder 83 in a state of being allowed to correspond to the shared resource individual information 813. Therefore, the user of the client terminal 11 can easily confirm whether the resource stored in the download folder 83 is the local resource 851 or the copy resource 84.

The copy resource 84 is stored in the client terminal 11, and the shared resource 86 is stored in the client terminal 21. Specifically, the copy resource 84 holds the information recorded in the shared resource 86 from which it was copied, yet has an entity different from that of the shared resource 86. Hence, without concerning the shared resource 86 from which the copy resource 84 was copied, the user of the client terminal 11 can edit the copy resource 84 independently.

Note that the user may select a plurality of the shared resources 86 at the time of the downloading. In this case, the process of Steps S103 to S106 is repeated in response to the number of selected shared resources 86.

(12) Update of Shared Resource

Next, a description is made of operations of the client terminal 11 when updating the shared resource 86. The user of the client terminal 11 can update the shared resource 86 by using the edited copy resource 84.

Figure 29:
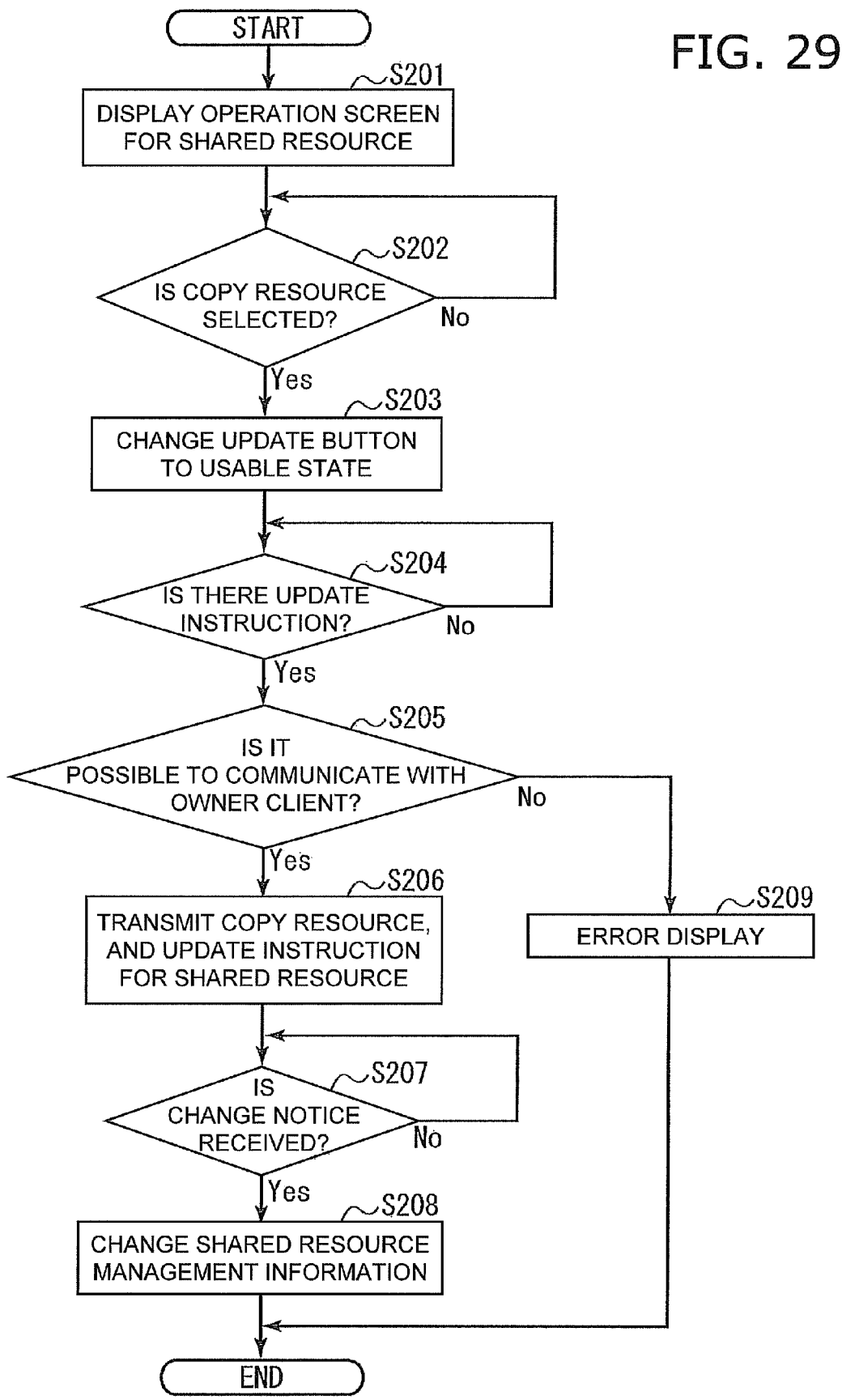
FIG. 29 is a flowchart of the client terminal that updates the shared resource in the Second Preferred Embodiment of the present invention.

FIG. 29 is a flowchart of the client terminal 11 when updating the shared resource 86. As an initial state, the client terminals 11 and 21 and the relay servers 12 and 22 store the shared resource management information 81 shown in FIG. 23, and the client terminal 11 stores the copy resource management information 82 shown in FIG. 24.

First, the client terminal 11 displays the operation screen 87, which is shown in FIG. 26, on the monitor in response to an instruction of the user (Step S201). Note that, on the operation screen 87 shown in FIG. 26, the update button 892 cannot be used.

The user of the client terminal 11 selects "presentation material.ppt" (copy resource 841) displayed on the download folder display portion 891. From attribute display of the download folder display portion 891, the user can easily recognize the copy resource 84 stored in the download folder 83.

In the case where the copy resource 84 is selected (Yes in Step S202), the client terminal 11 makes the update button 892 usable (Step S203). It is determined whether or not the copy resource 84 is selected based on whether or not the copy resource individual information 822 corresponding to the selected resource is present.

In the case where the user of the client terminal 11 has clicked the update button 892 (Yes in Step S204), the client terminal 11 specifies the shared resource individual information 813-2 based on the copy resource individual information 822-1. Based on the shared resource individual information 813-2, it is specified that the client terminal 21 is the owner client terminal of the shared resource 861. The client terminal 11 then refers to the relay group information 40 and the relay server information 50, and confirms whether or not it is possible to communicate with the client terminal 21 (Step S205).

When it is impossible to communicate with the client terminal 21 (No in Step S205), the client terminal 11 displays an error message indicating that the update of the shared resource 861 based on the copy resource 841 cannot be performed (Step S209), and ends the process shown in FIG. 29.

On the other hand, when it is possible to communicate with the client terminal 21 (Yes in Step S205), the client terminal 11 transmits the copy resource 841 and an update instruction for the shared resource 861 (Step S206). Based on the instruction from the client terminal 11, the client terminal 21 overwrites the shared resource 861 with the received copy resource 841.

Following the update of the shared resource 861, the client terminal 21 changes values of "lastmod" and "len" in the shared resource individual information 813-2. A change notice of the shared resource management information 81 is transmitted from the client terminal 21 to the client terminal 11. Upon having received the change notice (Yes in Step S207), the client terminal 11 changes the shared resource individual information 813-2 based on the change notice (Step S208). In response to the change of the shared resource individual information 813-2, the display of the operation screen 87 is updated. In such a way, the process shown in FIG. 29 is ended.

Note that the client terminal 11 may update the shared resource individual information 813-2 with contents corresponding to the copy resource 841 to replace the shared resource 861 with the copy resource 841. Specifically, in the shared resource individual information 813-2, "owner' is updated to "client-1@relay-server-1.abc.net" as the identification information of the client terminal 11. "path" is updated to the full path of the copy resource 841. In such a way, the copy resource 841 is shared in place of the shared resource 861 without having to transmit the copy resource 841 to the client terminal 21. With regard to the shared resource 861 stored in the client terminal 21, the sharing thereof is released.

Note that the user may select a plurality of the copy resources 84 at the time of updating the shared resource 86. In this case, the process of Steps S205 to S209 is repeated depending on the number of selected copy resources 84.

(13) Deletion of the Copy Resource Individual Information

Next, a description is made of the deletion of the copy resource individual information 822. The copy resource individual information 822 is deleted when the association between the copy resource 84 and the shared resource individual information 813 is not necessary. Specifically, at the time of deleting the copy resource 84, and at the time of deleting or releasing the sharing of the shared resource 86 from which the copy resource 84 was copied, the copy resource individual information 822 is deleted.

First, a description is made of the deletion of the copy resource individual information 822 that follows the deletion of the copy resource 84. In the case where the user has deleted the copy resource 84 by clicking the deletion button 893, the client terminal 11 deletes the copy resource individual information 822 corresponding to the deleted copy resource 84. For example, in the case where the copy resource 841 is deleted, the client terminal 11 deletes the copy resource individual information 822-1.

Next, a description is made of the deletion of the copy resource individual information 822 that follows the deletion of the shared resource 86 or the release of the sharing thereof. In the case where the shared resource 86 is deleted in the client terminal 21, the client terminal 11 receives a change notice indicating the deletion of the shared resource 86. The client terminal 11 deletes the shared resource individual information 813 that corresponds to the shared resource ID included in the change notice, from the shared resource management information 81. Moreover, the copy resource individual information 822 that corresponds to the shared resource ID included in the change notice is deleted from the copy resource management information 82. Note that, in the case where the sharing of the shared resource 86 is released, the copy resource information 822 is also deleted in a similar way.

For example, in the case where the shared resource 861 is deleted in the client terminal 21, the client terminal 11 deletes the shared resource individual information 813-2 from the shared resource management information 81, and deletes the copy resource individual information 822-1 from the copy resource management information 82. Following the deletion of the copy resource individual information 822-1, the copy resource 841 becomes the local resource 851. Hence, on the download folder display portion 891, the attribute column corresponding to the copy resource 841 is changed to blank.

As described above, the copy resource management information 82 is updated in real time in response to the deletion of the copy resource 84 and the deletion of the shared resource 86 corresponding to the copy resource 84. In such a way, the user of the client terminal 11 can confirm a corresponding relationship between the copy resource 84 and the shared resource 86 in real time.

As described above, the client terminal 11 according to the present preferred embodiment creates the copy resource individual information 822, which allows the shared resource individual information 813 and the copy resource 84 to correspond to each other, when downloading the shared resource 86. In such a way, the client terminal 11 can manage the copy resource 84 in a way so as to allow the copy resource 84 to correspond to the shared resource 86. Hence, when the shared resource 86 is updated using the copy resource 84, the shared resource 86 can be updated through the instructions for selecting and updating the copy resource, and accordingly, the operations of the user can be simplified.

The description has been made above of the respective preferred embodiments of the present invention; however, the present invention is not limited to the above-described preferred embodiments, and is modifiable within the scope of the following claims without departing from the spirit of the invention.

The present invention can be widely applied to a relay server and a relay communication system which enable the client terminal connected to the remote LAN (Local Area Network) to make communication beyond the WAN (Wide Area Network).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A communication apparatus configured to communicate through a first relay server connected to a first network with a second relay server connected to a second network, and to function as a first client terminal connected to the first network, the communication apparatus comprising:
   a relay group information storage unit configured to store relay group information indicating that the first relay server and the second relay server constitute a relay group;
   a relay server information storage unit configured to store relay server information;
   the relay server information including:
      first relay server information created by the first relay server, the first relay server information including first relay server activation information indicating an activation state of the first relay server, and first client terminal registration information regarding the first client terminal which is registered in the first relay server, the first client terminal registration information includes a connection state between the first relay server and the first client terminal; and
      second relay server information created by the second relay server, the second relay server information including second relay server activation information indicating an activation state of the second relay server, and second client terminal registration information regarding a second client terminal connected to the second network and registered in the second relay server, the second client terminal registration information includes a connection state between the second relay server and the second client terminal;
   a shared resource information management unit configured to manage shared resource information regarding a shared resource shared with the second client terminal; and
   a copy resource information management unit configured to acquire a copy of a first shared resource based on the relay group information, the relay server information and the shared resource information, and manage a copy resource individual information that allow the first shared resource and the copy of the first shared resource to correspond to each other.

2. The communication apparatus according to claim 1, further comprising:
   an update instruction unit configured to assign a storage destination of the first shared resource so as to replace the first shared resource with the copy of the first shared resource based on the relay group information, the relay server information and the shared resource information.

3. The communication apparatus according to claim 2, wherein,
   when the first shared resource is deleted, the copy resource information management unit releases the corresponding relationship between the first shared resource and the copy of the first shared resource.

4. The communication apparatus according to claim 3, wherein,
   when the sharing of the first shared resource is released, the copy resource information management unit releases the corresponding relationship between the first shared resource and the copy of the first shared resource.

5. The communication apparatus according to claim 4, wherein,
   when the copy of the first shared resource is deleted, the copy resource information management unit releases the corresponding relationship between the first shared resource and the copy of the first shared resource.

6. The communication apparatus according to claim 1, wherein,
   when the first shared resource is deleted, the copy resource information management unit releases the corresponding relationship between the first shared resource and the copy of the first shared resource.

7. The communication apparatus according to claim 1, wherein, when the sharing of the first shared resource is released, the copy resource information management unit releases the corresponding relationship between the first shared resource and the copy of the first shared resource.

8. The communication apparatus according to claim 1, wherein, when the copy of the first shared resource is deleted, the copy resource information management unit releases the corresponding relationship between the first shared resource and the copy of the first shared resource.

9. previously presented): The communication apparatus according to claim 1, further comprising:

a monitor on which an operation screen is displayed based on the shared resource information and the copy resource individual information.

10. The communication apparatus according to claim 2, wherein, when the sharing of the first shared resource is released, the copy resource information management unit releases the corresponding relationship between the first shared resource and the copy of the first shared resource.

11. The communication apparatus according to claim 10, wherein, when the copy of the first shared resource is deleted, the copy resource information management unit releases the corresponding relationship between the first shared resource and the copy of the first shared resource.

12. The communication apparatus according to claim 2, wherein, when the copy of the first shared resource is deleted, the copy resource information management unit releases the corresponding relationship between the first shared resource and the copy of the first shared resource.

13. The communication apparatus according to claim 6, wherein, when the sharing of the first shared resource is released, the copy resource information management unit releases the corresponding relationship between the first shared resource and the copy of the first shared resource.

14. The communication apparatus according to claim 13, wherein, when the copy of the first shared resource is deleted, the copy resource information management unit releases the corresponding relationship between the first shared resource and the copy of the first shared resource.

15. The communication apparatus according to claim 6, wherein, when the copy of the first shared resource is deleted, the copy resource information management unit releases the corresponding relationship between the first shared resource and the copy of the first shared resource.

16. The communication apparatus according to claim 3, wherein, when the copy of the first shared resource is deleted, the copy resource information management unit releases the corresponding relationship between the first shared resource and the copy of the first shared resource.

17. The communication apparatus according to claim 7, wherein, when the copy of the first shared resource is deleted, the copy resource information management unit releases the corresponding relationship between the first shared resource and the copy of the first shared resource.

* * * * *